(12) United States Patent
Nakatsuka et al.

(10) Patent No.: US 12,532,483 B2
(45) Date of Patent: Jan. 20, 2026

(54) SEMICONDUCTOR MEMORY DEVICE

(71) Applicant: Kioxia Corporation, Tokyo (JP)

(72) Inventors: Keisuke Nakatsuka, Kobe Hyogo (JP);
Yasuhiro Uchiyama, Yokkaichi Mie (JP); Akira Mino, Yokkaichi Mie (JP);
Masayoshi Tagami, Kuwana Mie (JP);
Shinya Arai, Yokkaichi Mie (JP)

(73) Assignee: Kioxia Corporation, Tokyo (JP)

( * ) Notice: Subject to any disclaimer, the term of this patent is extended or adjusted under 35 U.S.C. 154(b) by 268 days.

(21) Appl. No.: 18/330,779

(22) Filed: Jun. 7, 2023

(65) Prior Publication Data

US 2023/0320107 A1 Oct. 5, 2023

Related U.S. Application Data

(63) Continuation of application No. PCT/JP2020/047089, filed on Dec. 17, 2020.

(51) Int. Cl.
*H10B 80/00* (2023.01)
*G11C 16/04* (2006.01)
(Continued)

(52) U.S. Cl.
CPC ......... *H10B 80/00* (2023.02); *G11C 16/0483* (2013.01); *G11C 16/26* (2013.01);
(Continued)

(58) Field of Classification Search
CPC ........ H10B 80/00; H10B 41/27; H10B 43/27; H10B 43/10; G11C 16/0483; G11C 16/26;
(Continued)

(56) References Cited

U.S. PATENT DOCUMENTS 10,424,384 B2   9/2019  Higashi et al.
10,868,037 B2 * 12/2020 Arai ............... H10B 43/40
(Continued)

FOREIGN PATENT DOCUMENTS

CN  108022933 A   5/2018
CN  110537260 A  12/2019
(Continued)

OTHER PUBLICATIONS

International Search Report (ISR) (and English translation thereof) dated Mar. 9, 2021, issued in International Application No. PCT/JP2020/047089.

(Continued)

*Primary Examiner* — Allison Bernstein
(74) *Attorney, Agent, or Firm* — Holtz, Holtz & Volek PC

(57) ABSTRACT

A semiconductor storage device of an embodiment includes a substrate, a plurality of first conductive layers, pillar, and a second conductive layer. The plurality of first conductive layers are provided above the substrate, and mutually separated in a first direction. The pillar is provided to penetrate the plurality of the first conductive layers, and includes a first semiconductor layer extending in the first direction. A part of the pillar that intersects with the first conductive layers are functioned as memory cells. The second conductive layer is provided above the plurality of first conductive layers and is in contact with the first semiconductor layer. The second conductive layer is made of a metal or a silicide.

8 Claims, 31 Drawing Sheets

(51) Int. Cl.
  *G11C 16/26* (2006.01)
  *H01L 23/00* (2006.01)
  *H01L 25/00* (2006.01)
  *H01L 25/065* (2023.01)
  *H01L 25/18* (2023.01)
  *H10B 41/27* (2023.01)
  *H10B 43/27* (2023.01)

(52) U.S. Cl.
  CPC .............. *H01L 24/08* (2013.01); *H01L 24/80* (2013.01); *H01L 25/0657* (2013.01); *H01L 25/18* (2013.01); *H01L 25/50* (2013.01); *H10B 41/27* (2023.02); *H10B 43/27* (2023.02); *H01L 2224/08145* (2013.01); *H01L 2224/80006* (2013.01); *H01L 2224/80895* (2013.01); *H01L 2224/80896* (2013.01); *H01L 2924/1431* (2013.01); *H01L 2924/14511* (2013.01)

(58) Field of Classification Search
  CPC ..... H01L 24/08; H01L 24/80; H01L 25/0657; H01L 25/18; H01L 25/50; H01L 2224/08145; H01L 2224/80006; H01L 2224/80895; H01L 2224/80896; H01L 2924/1431; H01L 2924/14511
  See application file for complete search history.

(56) References Cited

U.S. PATENT DOCUMENTS

| | | |
|---|---|---|
| 11,107,802 B2 | 8/2021 | Nakaki |
| 2014/0264547 A1 | 9/2014 | Kawai et al. |
| 2018/0122823 A1 | 5/2018 | Li et al. |
| 2019/0296041 A1 | 9/2019 | Yamasaka et al. |
| 2020/0350286 A1 | 11/2020 | Cheng et al. |
| 2023/0005957 A1* | 1/2023 | Nakatsuka ......... G11C 16/0483 |

FOREIGN PATENT DOCUMENTS

| | | |
|---|---|---|
| JP | 2014179465 A | 9/2014 |
| JP | 2019145191 A | 8/2019 |
| JP | 2019165135 A | 9/2019 |
| JP | 2020145233 A | 9/2020 |
| JP | 2020155484 A | 9/2020 |
| JP | 2020161672 A | 10/2020 |
| TW | 201941407 A | 10/2019 |
| TW | 202036836 A | 10/2020 |

OTHER PUBLICATIONS

Written Opinion (WO) dated Mar. 9, 2021, issued in International Application No. PCT/JP2020/047089.

* cited by examiner

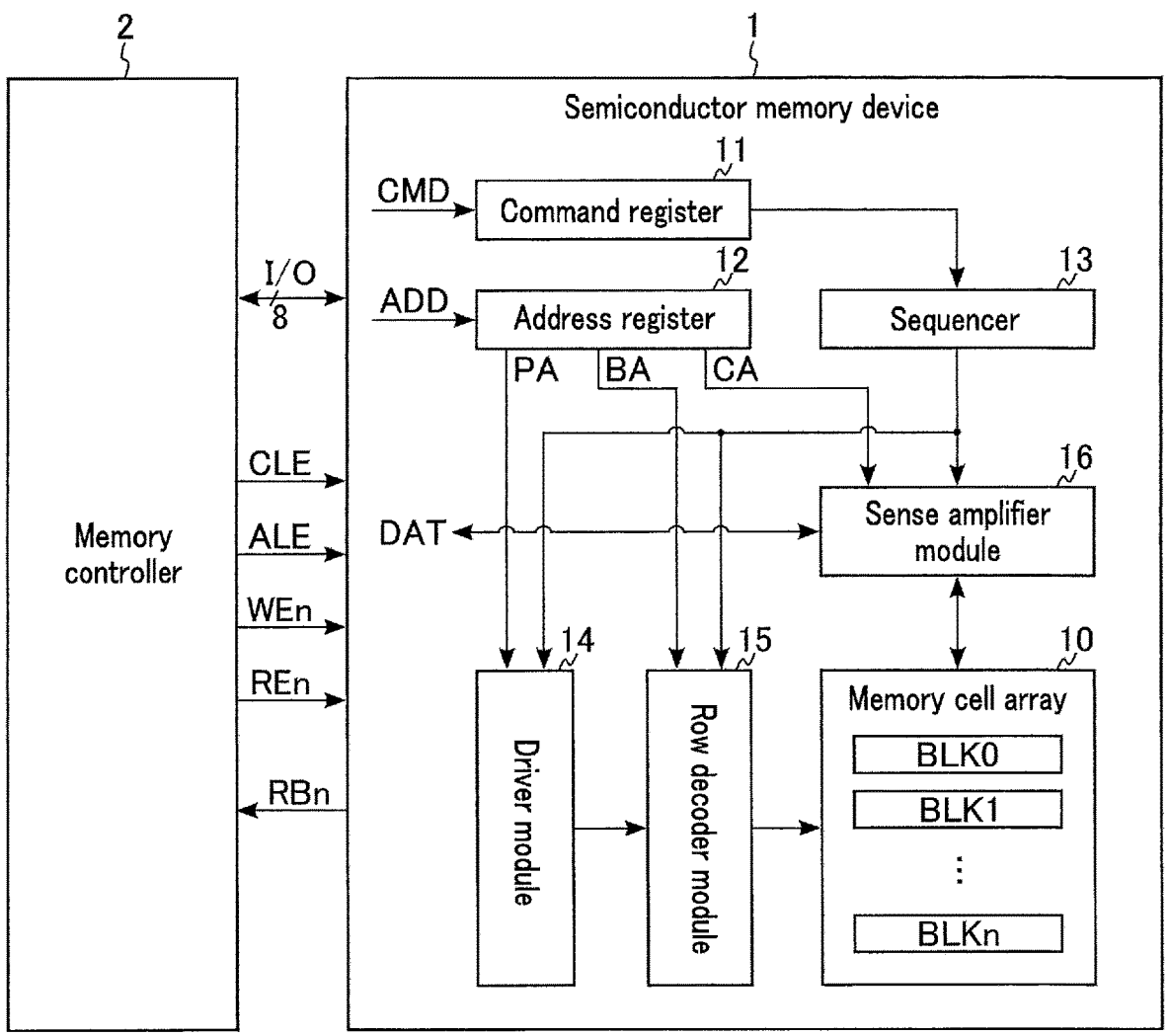
F I G. 1

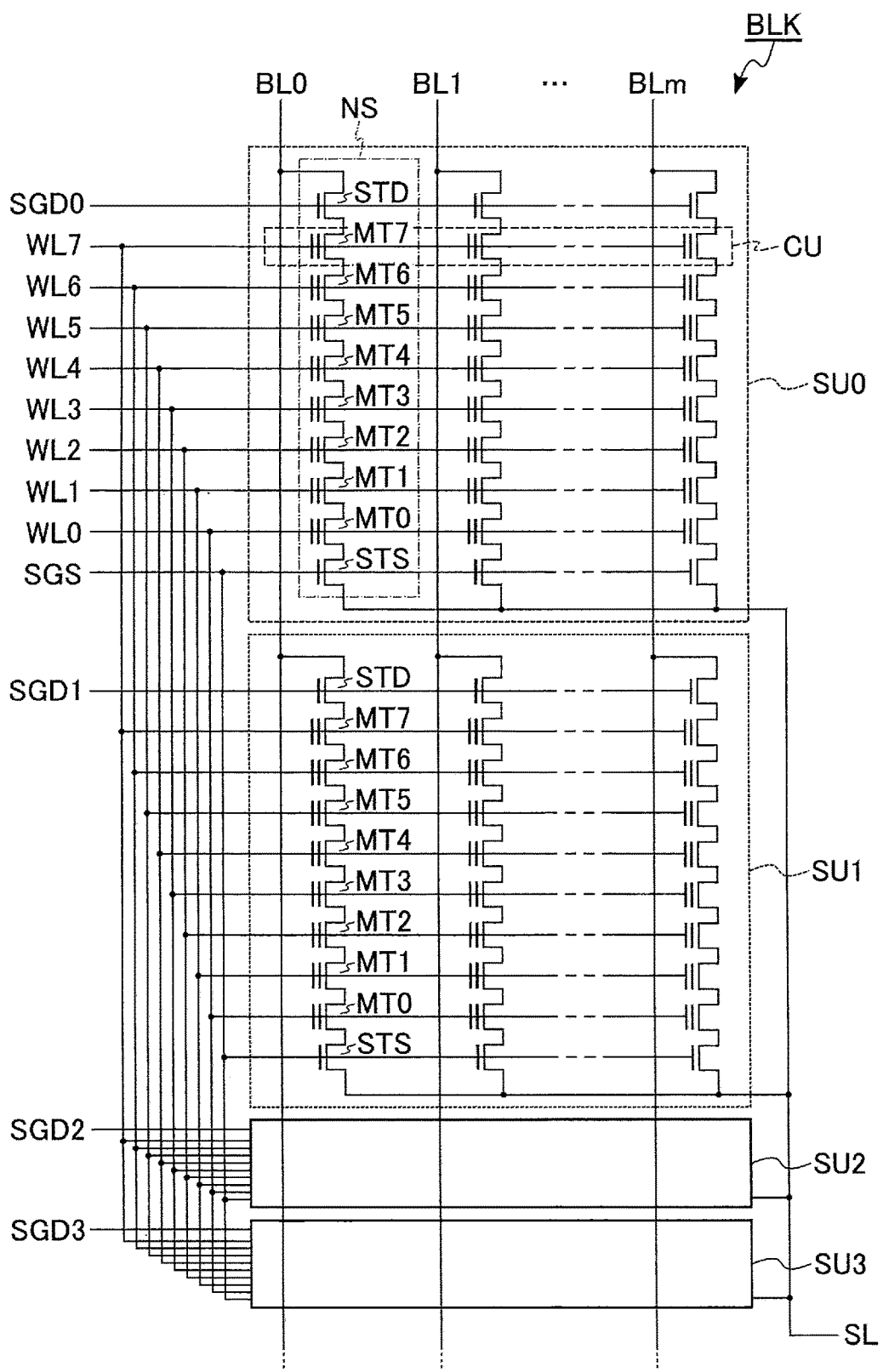
F I G. 2

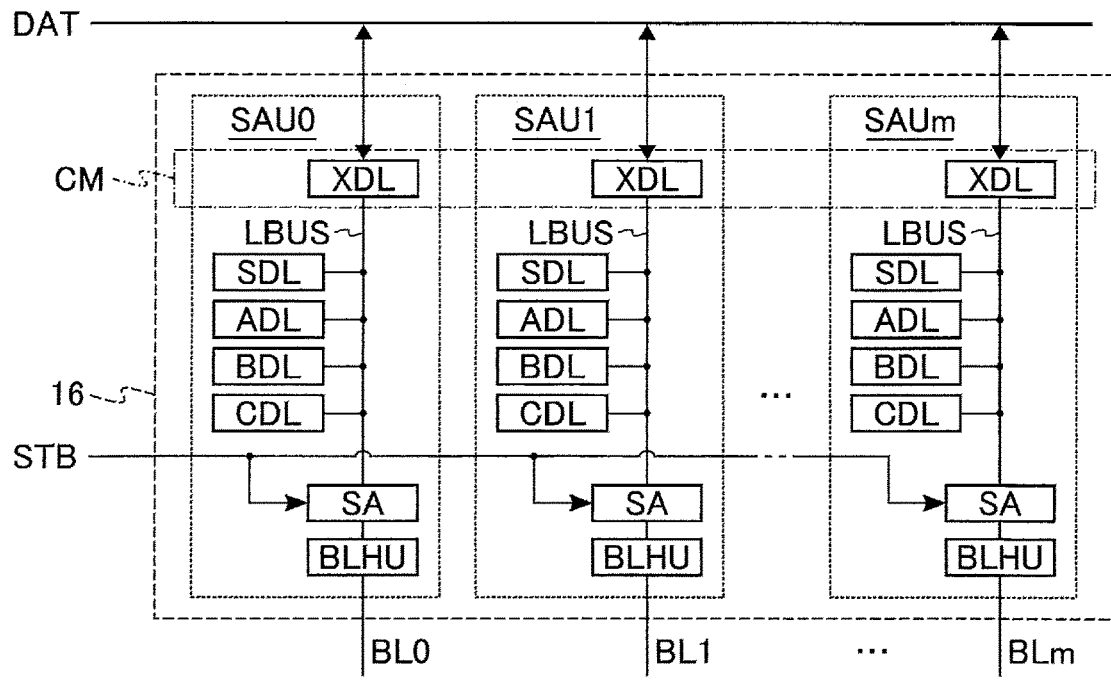
F I G. 4
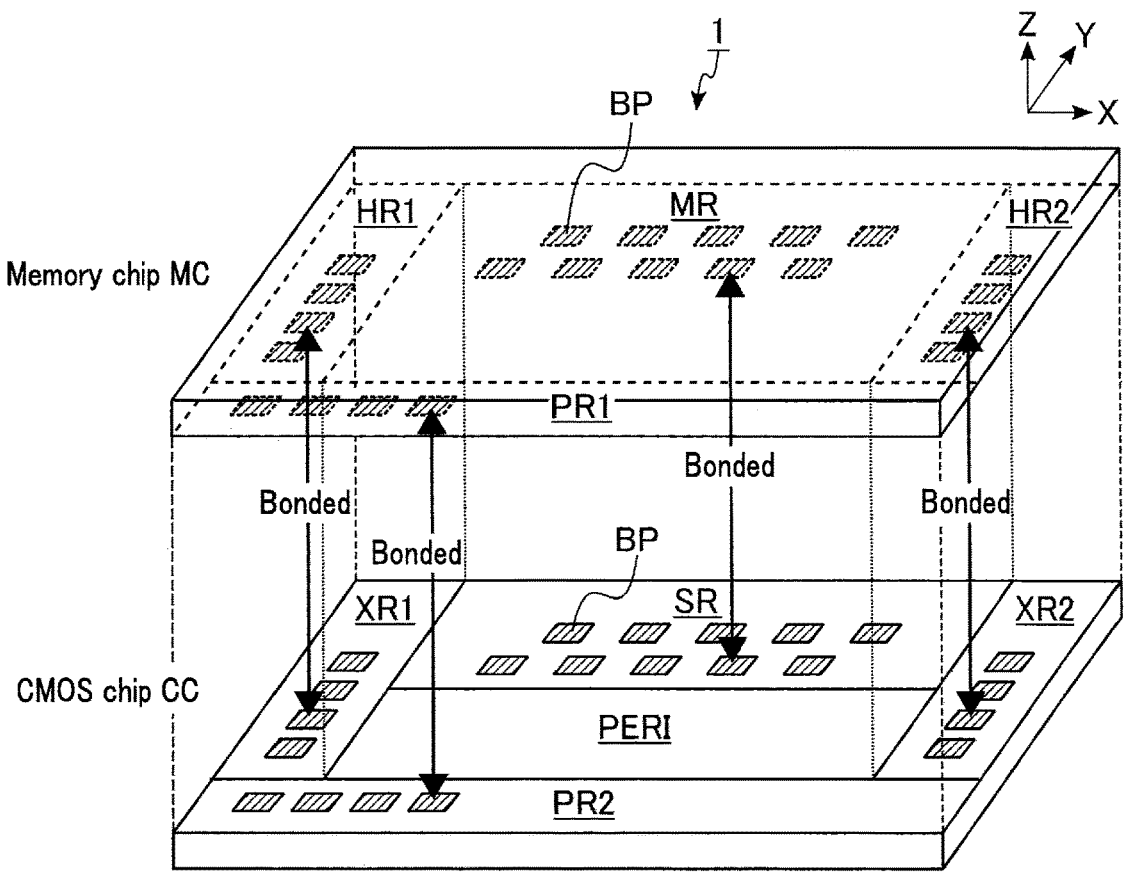
F I G. 5

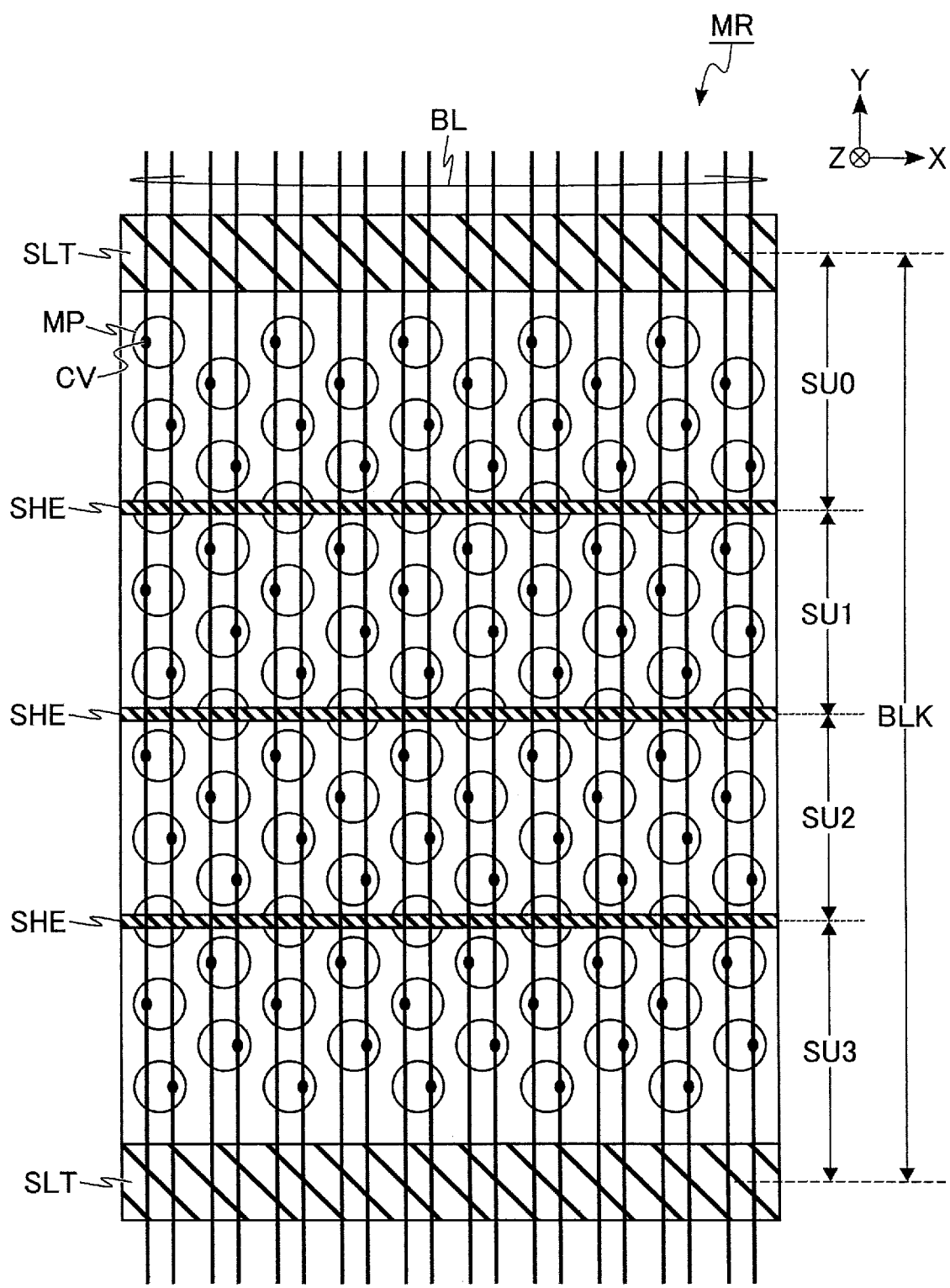
F I G. 6

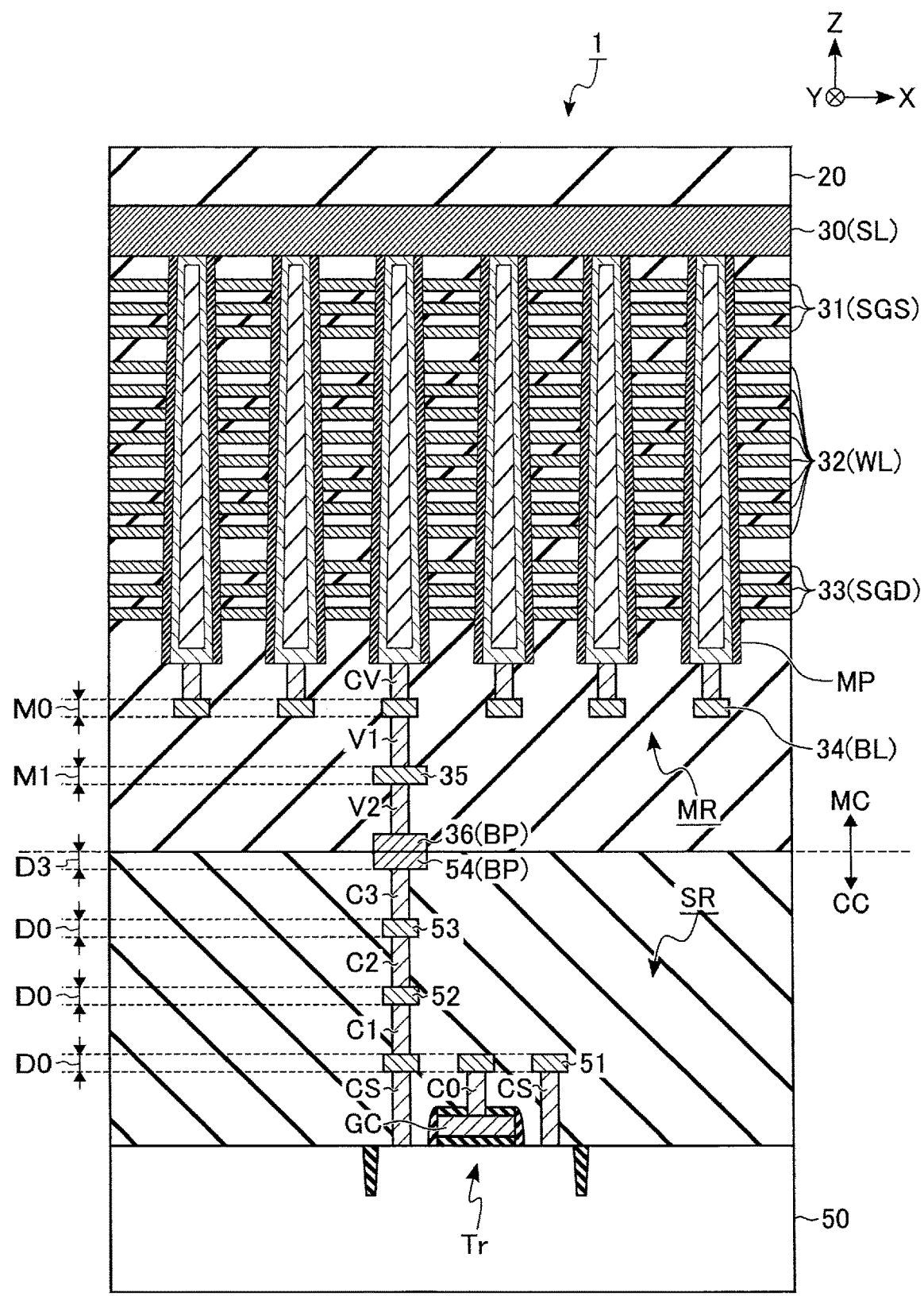
F I G. 9

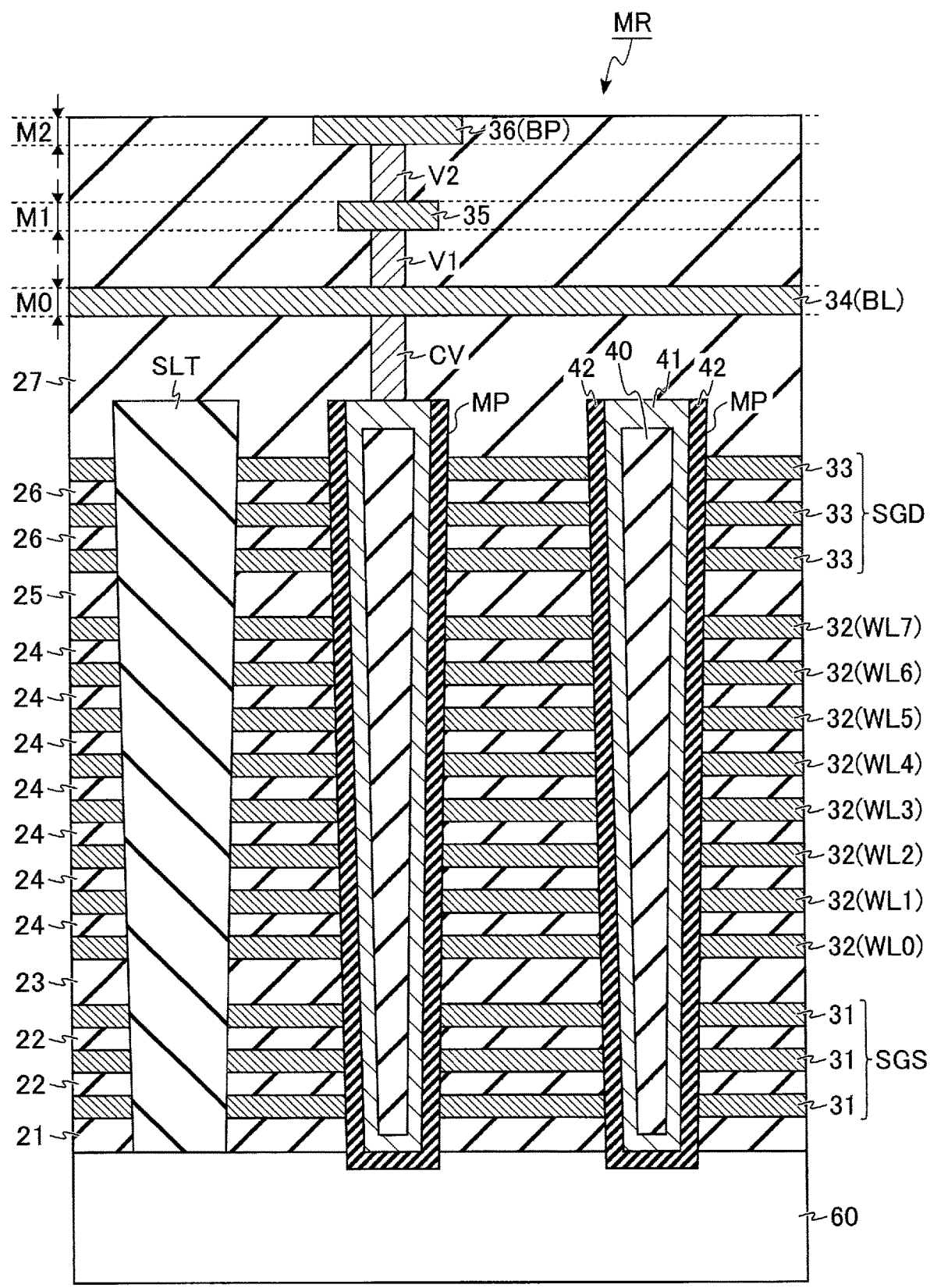
F I G. 11

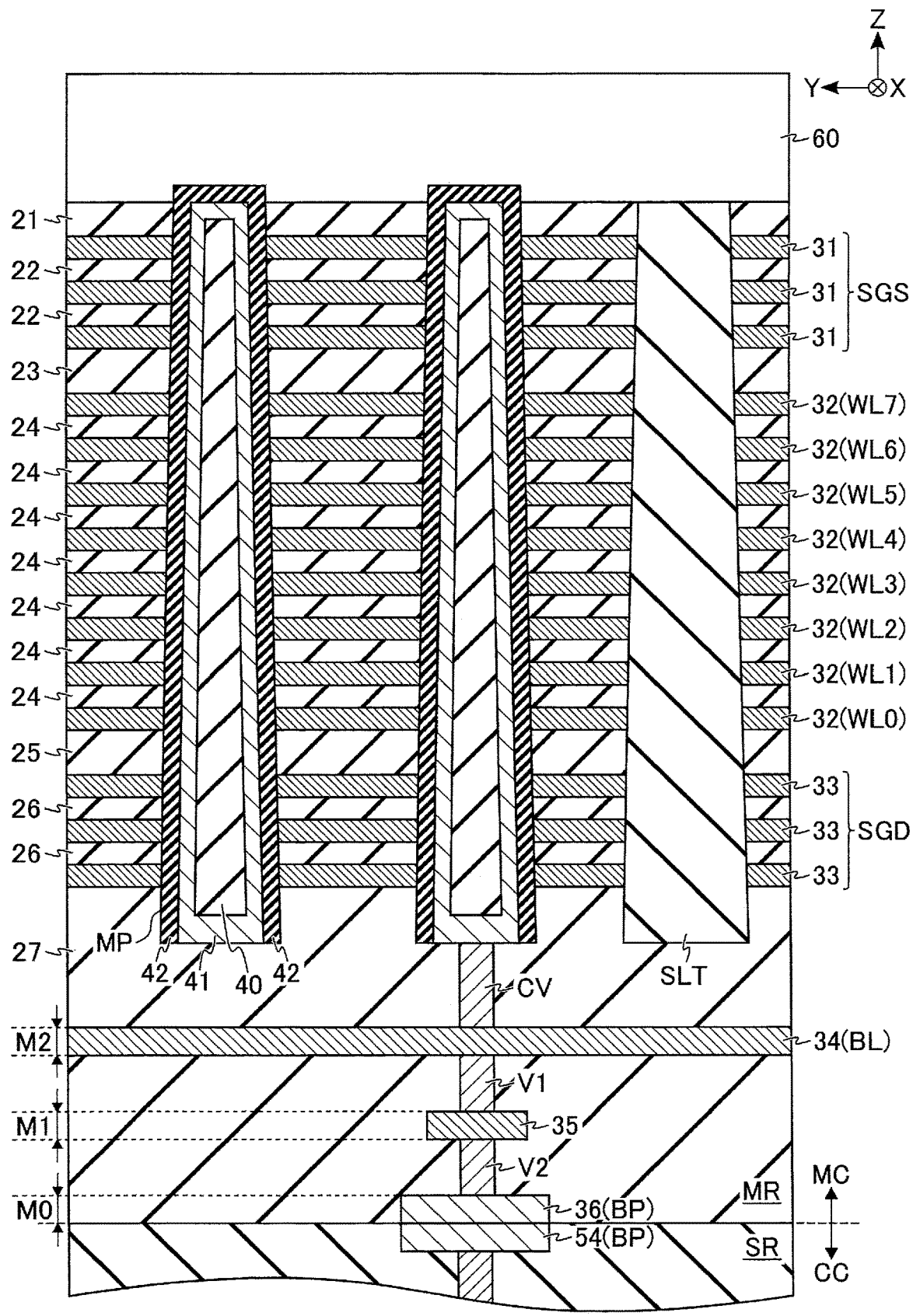
F I G. 12

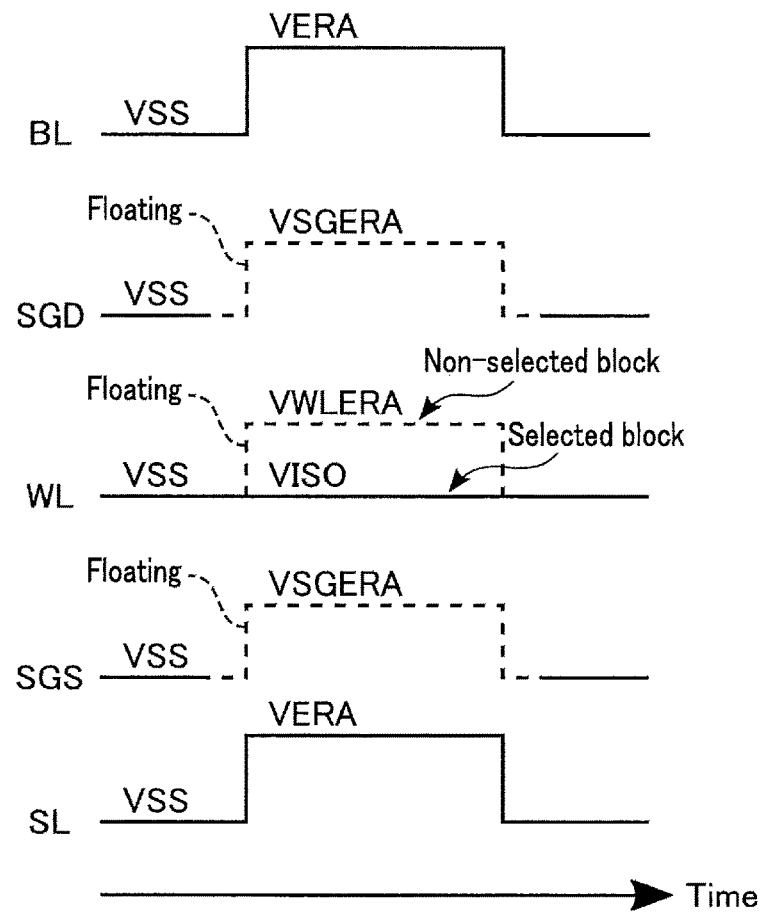
F I G. 17
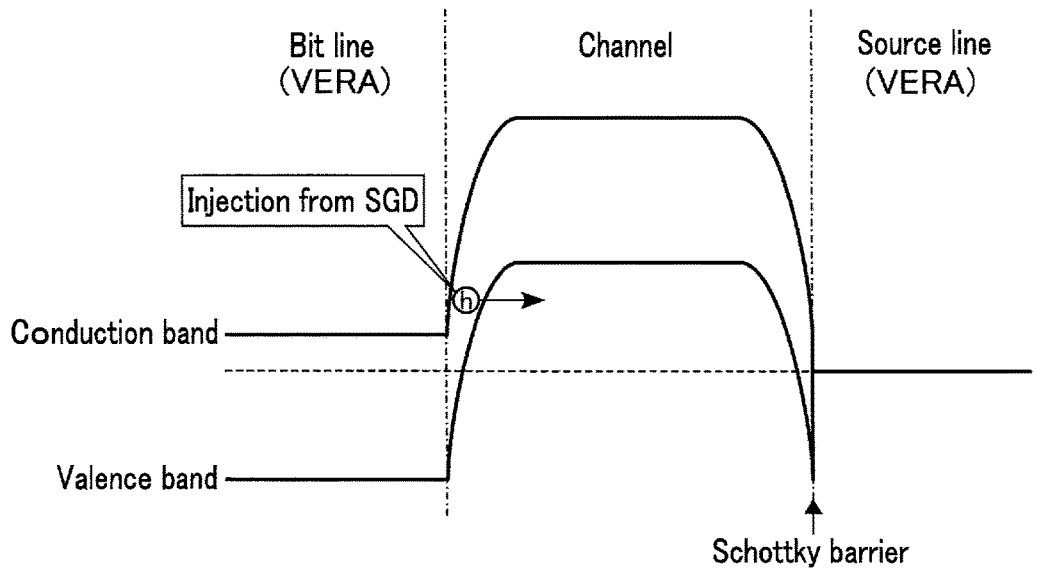
F I G. 18

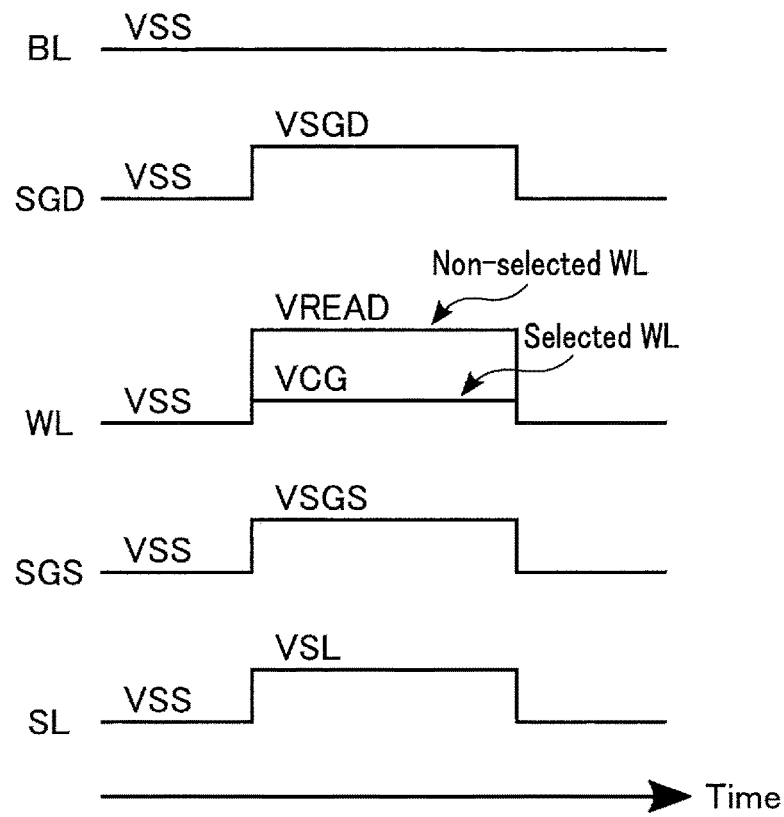
F I G. 20
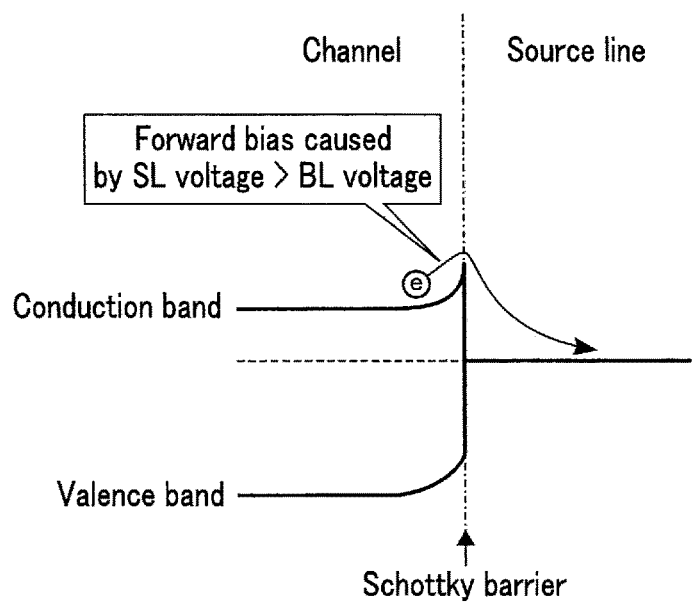
F I G. 21

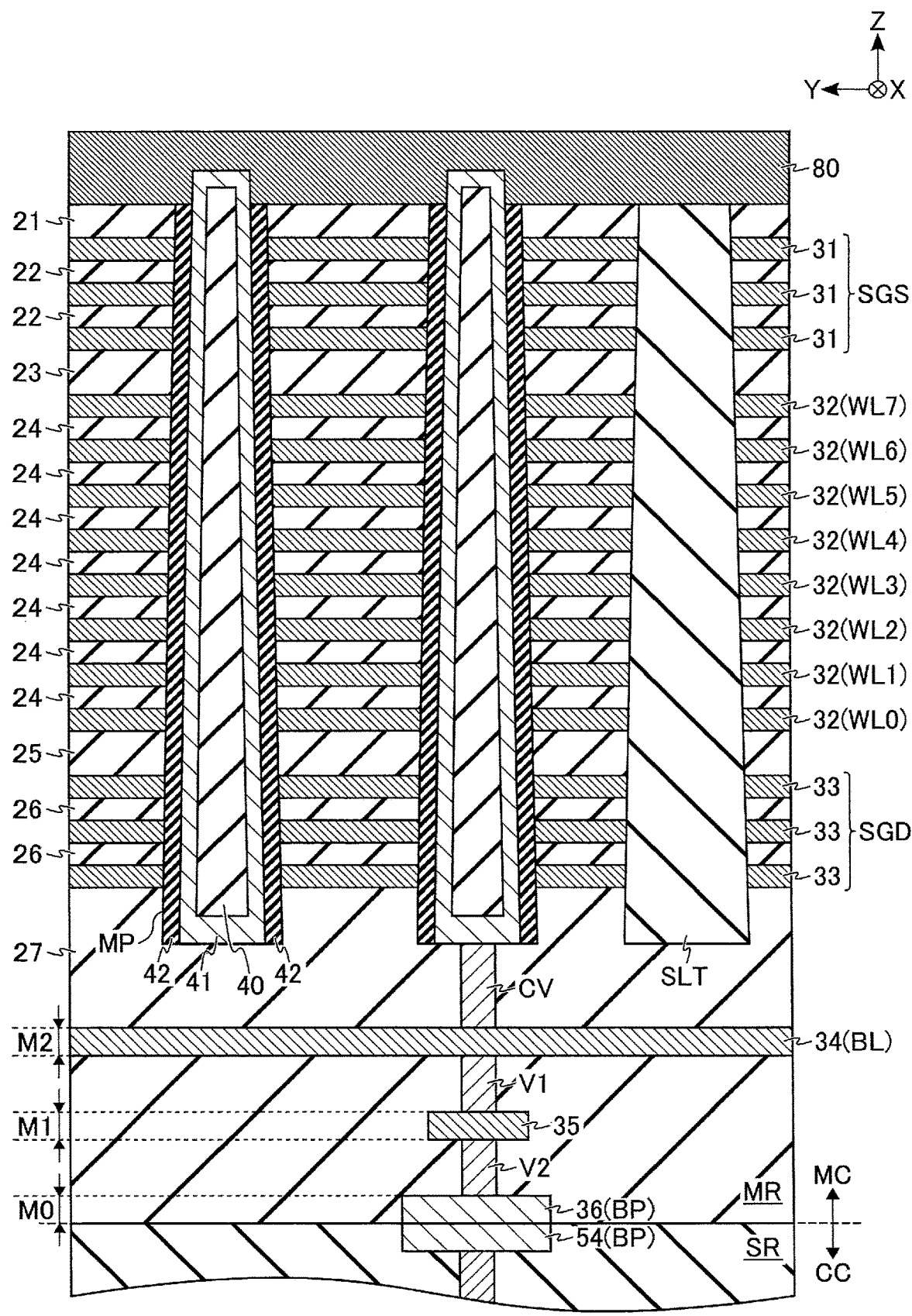
F I G. 27

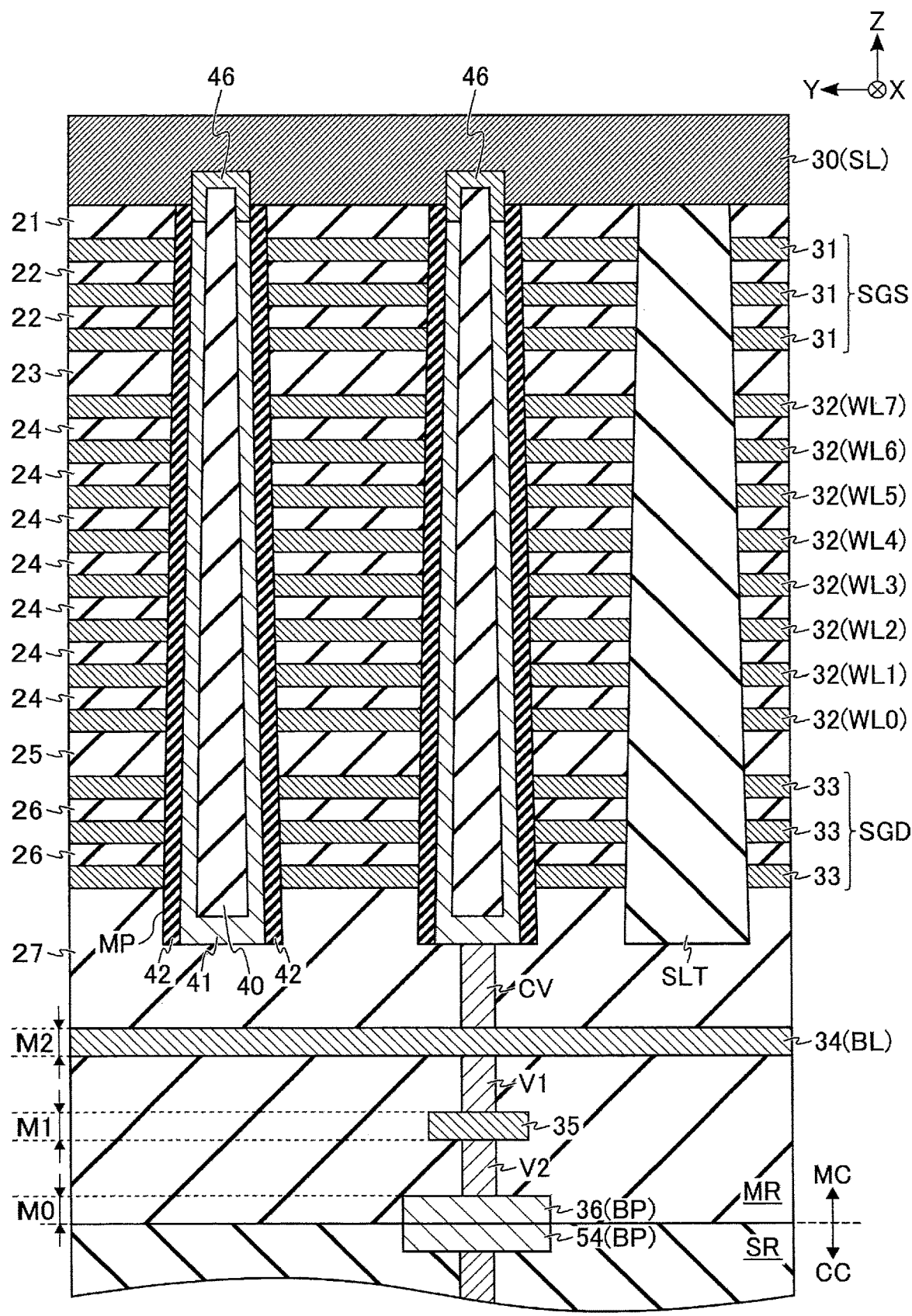
F I G. 30

12,532,483 B2

SEMICONDUCTOR MEMORY DEVICE

CROSS-REFERENCE TO RELATED APPLICATIONS

This application is a Continuation Application of PCT Application No. PCT/JP2020/047089, filed Dec. 17, 2020, the entire contents of which are incorporated herein by reference.

FIELD

The embodiment relates to a semiconductor memory device.

BACKGROUND

A NAND flash memory capable of storing data in a nonvolatile manner is known.

BRIEF DESCRIPTION OF THE DRAWINGS

FIG. 1 is a block diagram showing an example of a configuration of a semiconductor memory device according to a first embodiment.

FIG. 2 is a circuit diagram showing an example of a circuit configuration of a memory cell array included in the semiconductor memory device according to the first embodiment.

FIG. 4 is a circuit diagram showing an example of a circuit configuration of a sense amplifier module included in the semiconductor memory device according to the first embodiment.

FIG. 5 is a perspective view showing an example of the structure of the semiconductor memory device according to the first embodiment.

FIG. 6 is a plan view showing an example of a planar layout in a memory region of the semiconductor memory device according to the first embodiment.

FIG. 9 is a cross-sectional view showing an example of a cross-sectional structure including a memory region and a sense amplifier region of the semiconductor memory device according to the first embodiment.

FIGS. 11 to 14 are cross-sectional views showing an example of a cross-sectional structure during manufacturing of the semiconductor memory device according to the first embodiment.

FIG. 17 is a timing chart showing an example of an erase operation of the semiconductor memory device according to the first embodiment.

FIG. 18 is a schematic diagram showing an example of a band structure in a NAND string at the time of an erase operation of the semiconductor memory device according to the first embodiment.

FIG. 20 is a timing chart showing an example of a read operation of a semiconductor memory device according to a second embodiment.

FIG. 21 is a schematic diagram showing an example of a band structure in a NAND string at the time of a read operation of the semiconductor memory device according to the second embodiment.

FIGS. 26 to 30 are cross-sectional views showing an example of a cross-sectional structure during manufacturing of the semiconductor memory device according to the third embodiment.

DETAILED DESCRIPTION

Figure 3:
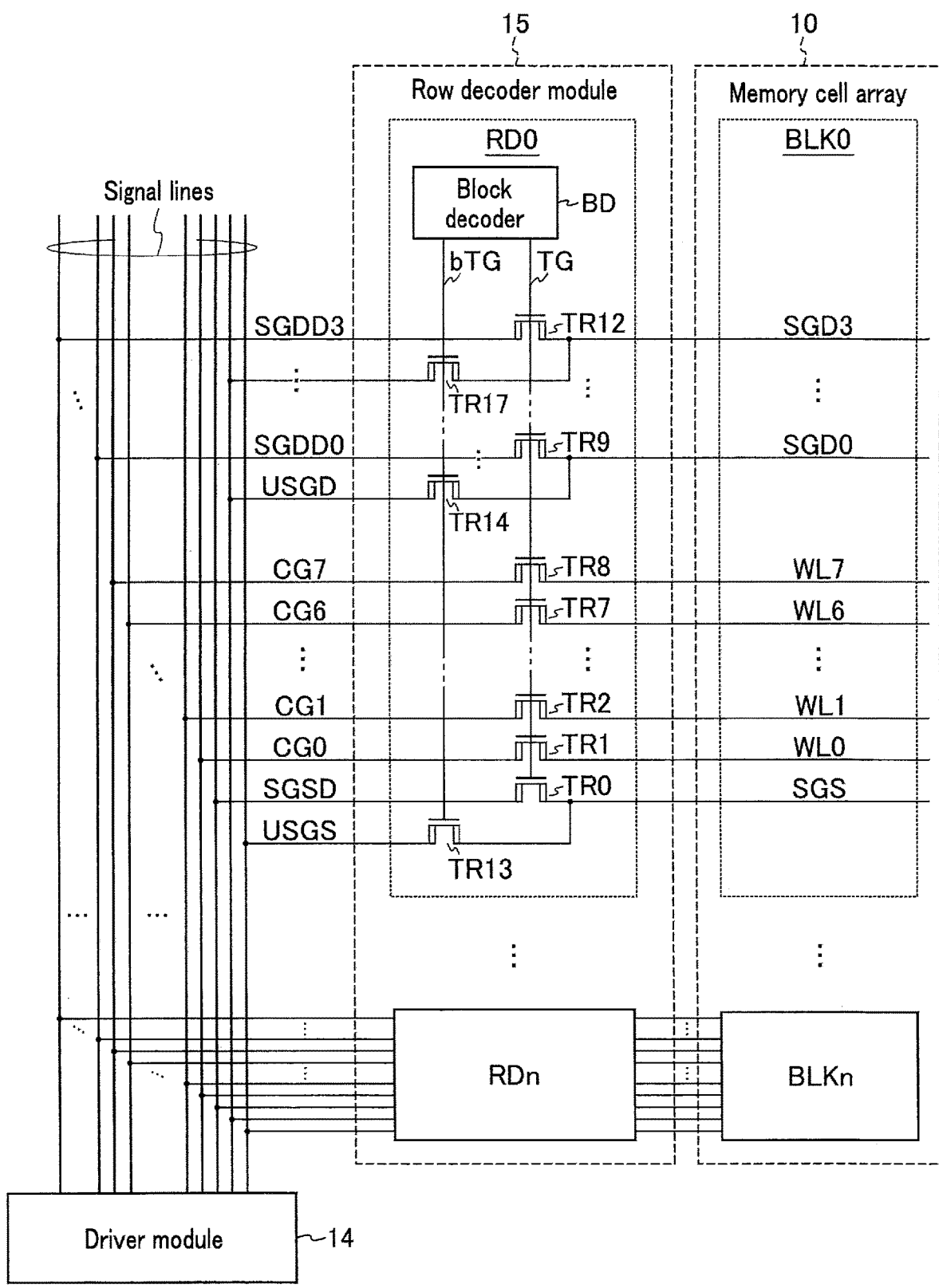
FIG. 3 is a circuit diagram showing an example of a circuit configuration of a row decoder module included in the semiconductor memory device according to the first embodiment.

In general, according to one embodiment, a A semiconductor storage device includes a substrate, a plurality of first coductive layers, pillar, and a second conductive layer. The plurality of first conductive layers are provided above the substrate, and mutually separated in a first direction. The pillar is provided to penetrate the plurality of the first conductive layers, and includes a first semiconductor layer extending in the first direction.

A part of the pillar that intersects with the first conductive layers are functioned as memory cells. The second conductive layer is provided above the plurality of first conductive layers and is in contact with the first semiconductor layer. The second conductive layer is made of a metal or a silicide.

Hereinafter, embodiments will be described with reference to the drawings. An embodiment exemplifies an apparatus and a method for embodying the technical idea of the invention. The drawings are schematic or conceptual, and the dimensions and ratios, etc. in the drawings are not always the same as the actual ones. The technical idea of the present invention is not specified by the shapes, structures, arrangements, etc. of the structural elements.

In the following descriptions, constituent elements having substantially the same functions and configurations will be denoted by the same reference symbols. A numeral following characters constituting a reference symbol is used to distinguish between elements that have the same configuration that are referred to by reference symbols that have the same characters. Similarly, a character following a numeral constituting a reference symbol is used to distinguish between elements that have the same configuration that are referred to by reference symbols that have the same numerals. If components represented by reference symbols including the same letters need not be distinguished, such components are assigned reference symbols including only the same letters or numerals.

<1> First Embodiment

A semiconductor memory device 1 according to the first embodiment is a type of NAND-type flash memory capable of storing data in a non-volatile manner. The semiconductor memory device 1 according to the first embodiment will be described.

<1-1> Configuration

<1-1-1> Overall Configuration of Semiconductor Memory Device 1

FIG. 1 is a block diagram illustrating an example of a configuration of a semiconductor memory device 1 according to the first embodiment. As illustrated in FIG. 1, the semiconductor memory device 1 is configured to be controllable by an external memory controller 2. The semiconductor memory device 1 includes, for example, a memory cell array 10, a command register 11, an address register 12, a sequencer 13, a driver module 14, a row decoder module 15 and a sense amplifier module 16.

The memory cell array 10 includes a plurality of blocks BLK0 to BLKn (n is an integer of 1 or more). Each block BLK includes a set of memory cells capable of storing data in a nonvolatile manner. The block BLK is used, for example, as a data erase unit. The memory cell array 10 is provided with a plurality of bit lines and a plurality of word lines, which will be described later. Each memory cell is associated with one bit line and one word line.

The command register 11 stores a command CMD which the semiconductor memory device 1 receives from the memory controller 2. The command CMD includes an instruction for causing the sequencer 13 to perform a read operation, a write operation, an erase operation, etc.

The address register 12 stores address information ADD which the semiconductor memory device 1 receives from the memory controller 2. The address information ADD includes, for example, a block address BA, a page address PA, and a column address CA. The block address BA, the page address PA and the column address CA are associated with a block BLK, a word line and a bit line, respectively.

The sequencer 13 controls the overall operation of the semiconductor memory device 1. For example, the sequencer 13 controls the driver module 14, row decoder module 15, and sense amplifier module 16, etc., based on a command CMD stored in the command register 11, to perform a read operation, a write operation, an erase operation, etc.

The driver module 14 is coupled to the row decoder module 15 via a plurality of signal lines and generates voltages used in the read operation, the write operation, the erase operation, etc. For example, the driver module 14 applies predetermined voltages to a signal line coupled to the word line selected based on the page address PA stored in the address register 12 and to signal lines coupled to the other word lines.

The row decoder module 15 transfers the voltages that the driver module 14 applies to the plurality of signal lines to the memory cell array 10. Further, in the memory cell array 10, the row decoder module 15 selects one block BLK associated with the block address BA stored in the address register 12, and transfers the voltages applied to different sets of signal lines between the selected block BLK and the unselected blocks BLK.

The sense amplifier module 16 transmits/receives data DAT to/from the memory controller 2 via an input/output circuit (not illustrated). In a write operation, the sense amplifier module 16 applies a voltage corresponding to the write data received from the memory controller 2 to each bit line. In a read operation, the sense amplifier module 16 determines the data stored in the memory cell, based on the voltage of the bit line, and transmits the read data determined based on the determination result to the memory controller 2.

Communications between the semiconductor memory device 1 and the memory controller 2 support, for example, a NAND interface standard. For example, in the communications between the semiconductor memory device 1 and the memory controller 2, an input/output signal I/O, a command latch enable signal CLE, an address latch enable signal ALE, a write enable signal WEn, a read enable signal REn and a ready/busy signal RBn are used.

The input/output signal I/O is, for example, an 8-bit signal and may include a command CMD, address information ADD, data DAT, etc. The command latch enable signal CLE is a signal indicating whether or not the input/output signal I/O received by the semiconductor memory device 1 is a command CMD. The address latch enable signal ALE is a signal indicating whether or not the input/output signal I/O received by the semiconductor memory device 1 is address information ADD. The write enable signal WEn is a signal for instructing the semiconductor memory device 1 to input the input/output signal I/O. The read enable signal REn is a signal for instructing the semiconductor memory device 1 to output the input/output signal I/O. The ready/busy signal RBn is a signal that notifies the memory controller 2 whether the semiconductor memory device 1 is in a ready state or in a busy state. The ready state is a state in which the semiconductor memory device 1 accepts an instruction from the memory controller 2. The busy state is a state in which the semiconductor memory device 1 does not accept an instruction from the memory controller 2.

The semiconductor memory device 1 and memory controller 2 may constitute one semiconductor device by combining them together. Examples of such semiconductor devices include a memory card such as an SD™ card, and a solid state drive (SSD).

<1-1-2> Circuit Configuration of Semiconductor Memory Device 1
(Circuit Configuration of Memory Cell Array 10)

FIG. 2 is a circuit diagram illustrating an example of a circuit configuration of the memory cell array 10 provided in the semiconductor memory device 1 of the first embodiment. In FIG. 2, one block BLK included in the memory cell array 10 is extracted and illustrated. As illustrated in FIG. 2, the block BLK includes, for example, four string units SU0 to SU3. The block BLK includes a plurality of bit lines BL0 to BLm (m is an integer of 1 or more), a plurality of word lines WL0 to WL7, a plurality of select gate lines SGD0 to SGD3, a select gate line SGS, and a source line SL.

Each string unit SU includes a plurality of NAND strings NS. Different column addresses are assigned to the plurality of NAND strings NS. The plurality of NAND strings NS in each string unit SU are associated with bit lines BL0 to BLm, respectively. A plurality of NAND strings NS to which the same column address is assigned are coupled to the respective bit lines BL. A set consisting of the plurality of word lines WL0 to WL7, the plurality of select gate lines SGD0 to SGD3, and the select gate line SGS is provided for each block BLK. The source line SL is shared by a plurality of blocks BLK.

Each NAND string NS includes memory cell transistors MT0 to MT7 and select transistors STD and STS. Each of the memory cell transistors MT includes a control gate and a charge storage layer, and holds data in a nonvolatile manner according to a threshold voltage. The select transistors STD and STS are used, for example, for selecting a string unit SU during the write operation, the read operation, the erase operation, etc.

In each NAND string NS, the memory cell transistors MT0 to MT7 are coupled in series. The drain of the select transistor STD is coupled to each associated bit line BL. The source of the select transistor STD is coupled to one end of a set of memory cell transistors MT0 to MT7 coupled in series. The drain of the select transistor STS is coupled to the other end of the set of memory cell transistors MT0 to MT7 coupled in series. The source of the select transistor STS is coupled to a source line SL.

The control gates of the memory cell transistors MT0 to MT7 included in the same block BLK are coupled to the word lines WL0 to WL7, respectively. The gates of the select transistors STD in the string unit SU0 are coupled to the select gate line SGD0. The gates of the select transistors STD in the string unit SU1 are coupled to the select gate line SGD1. The gates of the select transistors STD in the string unit SU2 are coupled to the select gate line SGD2. The gates of the select transistors STD in the string unit SU3 are coupled to the select gate line SGD3. The gates of the select transistors STS included in the same block BLK are coupled to the select gate line SGS.

A set of a plurality of memory cell transistors MT coupled to a common word line WL within one string unit SU may be referred to as, for example, a "cell unit CU". For example, the storage capacity of the cell unit CU including a plurality of memory cell transistors MT each storing 1-bit data is defined as "1 page data". The memory cell transistor MT may have a storage capacity of 2 bits of data or more. The cell unit CU can have a storage capacity of two pages of data or more in accordance with the number of bits of data stored in the memory cell transistor MT. In connection with the first embodiment, a description will be given of the configuration and operation of the case where one memory cell transistor MT stores 3-bit data.

The memory cell array 10 may have other circuit configurations. For example, the number of string units SU included in each block BLK and the numbers of memory cell transistors MT and select transistors STD and STS included in each NAND string NS may be changed. The NAND string NS may include one or more dummy transistors. A select gate line SGS may be provided for each string unit SU.

(Circuit Configuration of Row Decoder Module 15)

FIG. 3 is a circuit diagram illustrating an example of a circuit configuration of the row decoder module 15 provided in the semiconductor memory device 1 of the first embodiment. As illustrated in FIG. 3, the row decoder module is coupled to the driver module 14 via signal lines CG0 to CG7, SGDD0 to SGDD3, SGSD, USGD and USGS. The row decoder module 15 includes row decoders RD0 to RDn (n is an integer of 1 or more). The row decoders RD0 to RDn are associated with the blocks BLK0 to BLKn, respectively. A detailed circuit configuration of the row decoder RD will be described below, focusing on the row decoder RD0.

The row decoder RD includes, for example, transistors TR0 to TR17, transfer gate lines TG and bTG, and a block decoder BD.

Each of the transistors TR0 to TR17 is a high-breakdown-voltage N-type MOS transistor. The gates of the transistors TR0 to TR12 are coupled to the transfer gate line TG. The gates of the transistors TR13 to TR17 are coupled to the transfer gate line bTG. The drain and source of each transistor TR are coupled between one of the plurality of signal lines coupled to the driver module 14 and one of the plurality of interconnects coupled to the block BLK associated with the row decoder RD.

Specifically, the drain of the transistor TR0 is coupled to the signal line SGSD. The source of the transistor TR0 is coupled to the select gate line SGS. The drains of the transistors TR1 to TR8 are coupled to the signal lines CG0 to CG7, respectively. The sources of the transistors TR1 to TR8 are coupled to the word lines WL0 to WL7, respectively. The drains of the transistors TR9 to TR12 are coupled to the signal lines SGDD0 to SGDD3, respectively. The drains of the transistors TR9 to TR12 are coupled to the select gate lines SGD0 to SGD3, respectively. The drain of the transistor TR13 is coupled to the signal line USGS. The source of the transistor TR13 is coupled to the select gate line SGS. The drains of the transistors TR14 to TR17 are coupled to the signal line USGD. The drains of the transistors TR14 to TR17 are coupled to the select gate lines SGD0 to SGD3, respectively.

The block decoder BD decodes a block address BA. The block decoder BD applies predetermined voltages to the transfer gate lines TG and bTG, based on the decoding result. The voltage applied to the transfer gate line TG and the voltage applied to the transfer gate line bTG have a complementary relationship. In other words, the inverted signal of a signal of the transfer gate line TG is input to the transfer gate line bTG.

The row decoder module 15 selects a block BLK by inputting a block address BA to each of the block decoders BD of the row decoders RD0 to RDn. For example, during a read or write operation, the block decoder BD associated with a selected block BLK applies "H" and "L" level voltages to the transfer gate lines TG and bTG, respectively. On the other hand, the block decoders BD associated with the unselected blocks BLK apply "L" and "H" level voltages to the transfer gate lines TG and bTG, respectively. As a result, the voltages applied to the different signal lines are transferred to the selected block BLK and the unselected blocks BLK.

The row decoder module 15 may have other circuit configurations. For example, the number of transistors TR included in the row decoder module 15 may be changed in accordance with the number of interconnects provided in each block BLK. Since the signal line CG is shared by a plurality of blocks BLK, it may be called a "global word line". Since the word line WL is provided for each block, it may be called a "local word line". Since each of the signal lines SGDD and SGSD is shared by a plurality of blocks BLK, it may be referred to as a "global transfer gate line". Since each of the selected gate lines SGD and SGS is provided for each block, it may be referred to as "local transfer gate line".

(Circuit Configuration of Sense Amplifier Module 16)

FIG. 4 is a circuit diagram illustrating an example of the circuit configuration of the sense amplifier module 16 provided in the semiconductor memory device 1 of the first embodiment. As illustrated in FIG. 4, the sense amplifier module 16 includes sense amplifier units SAU0 to SAUm (m is an integer of 1 or more). The sense amplifier units SAU0 to SAUm are associated with the bit lines BL0 to BLm, respectively. A circuit configuration of the sense amplifier unit SAU will be described below, focusing on the sense amplifier unit SAU0.

The sense amplifier unit SAU includes, for example, a bit line coupling unit BLHU, a sense amplifier section SA, a bus LBUS, and latch circuits SDL, ADL, BDL, CDL, VLDL, VHDL and XDL. The bit line coupling unit BLHU includes a high-breakdown-voltage transistor coupled between the bit line BL and the sense amplifier section SA. The sense amplifier section SA includes a circuit for determining the threshold voltage of the memory cell transistor MT, based on the voltage of the bit line BL. Each of the latch circuits SDL, ADL, BDL, and XDL is a circuit capable of temporarily storing data.

The sense amplifier section SA and the latch circuits SDL, ADL, BDL, and XDL are coupled to the bus LBUS. The latch circuits SDL, ADL, BDL, and XDL can transmit and receive data therebetween via the LBUS. The latch circuit XDL is used for the input/output of data DAT between the input/output circuit of the semiconductor memory device 1 and the sense amplifier unit SAU. The latch circuit XDL can also be used as a cache memory CM of the semiconductor memory device 1. The semiconductor memory device 1 can be in the ready state at least when the latch circuit XDL is vacant.

A control signal STB generated by the sequencer 13 is input to each sense amplifier section SA. When the control signal STB is asserted, the sense amplifier section SA determines a threshold voltage of the selected memory cell transistor MT, namely the data stored in the selected memory cell transistor MT. Briefly speaking, when the control signal STB is asserted, the sense amplifier section SA discharges the bus LBUS in accordance with the voltage of the associated bit line BL. Data ("0" or "1") that is based on the voltage of the bus LBUS at the time is stored in one of the latch circuits sharing the bus LBUS.

The sense amplifier module 16 may have other circuit configurations. For example, the number of latch circuits included in each sense amplifier unit SAU can be changed in accordance with the number of bits that can be stored in one memory cell transistor MT. One sense amplifier unit SAU may be allocated to a plurality of bit lines BL.

<1-1-3> Structure of Semiconductor Memory Device 1

Hereinafter, an example of the structure of the semiconductor memory device 1 according to the first embodiment will be described. In the drawings to be referred to hereinafter, a direction in which the word lines WL extend is referred to as an "X direction", a direction in which the bit lines BL extend is referred to as a "Y direction", and a direction vertical to the surface of a semiconductor substrate used for formation of the semiconductor memory device 1 is referred to as a "Z direction". In the plan views, hatching is added as appropriate to facilitate visualization of the drawings. The hatching added to the plan views, however, may not necessarily relate to the materials or properties of the hatched structural elements. In the plan views and cross-sectional views, interconnects, contacts, inter-layer insulating films, etc. are omitted as appropriate to facilitate visualization of the drawings.

(Overall Structure of Semiconductor Memory Device 1)

FIG. 5 is a perspective view showing an example of the structure of the semiconductor memory device 1 according to the first embodiment. As shown in FIG. 5, the semiconductor memory device 1 includes a memory chip MC and a CMOS chip CC. The lower surface of the memory chip MC and the upper surface of the CMOS chip CC are bonded to each other. The memory chip MC includes a structure corresponding to the memory cell array 10. The CMOS chip CC includes, for example, structures corresponding to the command register 11, the address register 12, the sequencer 13, the driver module 14, the row decoder module 15, and the sense amplifier module 16.

The region of the memory chip MC is divided into, for example, a memory region MR, hookup regions HR1 and HR2, and a pad region PR1. The memory region MR occupies most of the memory chip MC and is used for storing data. The memory region MR is interposed between the hookup regions HR1 and HR2 in the X direction. The hookup regions HR1 and HR2 are used for a coupling between the stacked interconnects provided in the memory chip MC and the row decoder module 15 provided in the CMOS chip CC. The pad region PR1 is adjacent to each of the memory region MR and the hookup regions HR1 and HR2 in the Y direction. The pad region PR1 includes, for example, a circuit related to an input/output circuit of the semiconductor memory device 1.

The memory chip MC includes a plurality of bonding pads BP below each of the memory region MR, the hookup regions HR1 and HR2, and the pad region PR1. The bonding pad BP may be called a "bonding metal". The bonding pads BP in the memory region MR are coupled to the associated bit lines BL. The bonding pad BP in the hookup region HR is coupled to an associated interconnect (for example, the word line WL) among the stacked interconnects provided in the memory region MR. The bonding pad BP in the pad region PR1 is electrically coupled to a pad (not shown) provided on the memory chip MC. The pads provided on the memory chip MC are used for a coupling between the semiconductor memory device 1 and the memory controller 2, for example.

The region of the CMOS chip CC is divided into, for example, a sense amplifier region SR, a peripheral circuit region PERI, transfer regions XR1 and XR2, and a pad region PR2. The sense amplifier region SR and the peripheral circuit region PERI are arranged adjacent to each other in the Y direction, and overlap the memory region MR. The sense amplifier region SR includes a sense amplifier module 16. The peripheral circuit region PERI includes the sequencer 13 and the like. The transfer regions XR1 and XR2 sandwich a set of the sense amplifier region SR and the peripheral circuit region PERI in the X direction, and overlap the hookup regions HR1 and HR2, respectively. The transfer regions XR1 and XR2 include a plurality of transistors included in the row decoder module 15. The pad region PR2 is disposed to overlap the pad region PR1 in the memory chip MC and includes an input/output circuit of the semiconductor memory device 1.

In addition, the CMOS chip CC includes a plurality of bonding pads BP on each of the sense amplifier region SR, the peripheral circuit region PERI, the transfer regions XR1 and XR2, and the pad region PR2. The plurality of bonding pads BP in the sense amplifier region SR are arranged to overlap the plurality of bonding pads BP in the memory region MR, respectively. The plurality of bonding pads BP in the transfer region XR1 are arranged to overlap the plurality of bonding pads BP in the hookup region HR1, respectively. The plurality of bonding pads BP in the transfer region XR2 are arranged to overlap the plurality of bonding pads BP in the hookup region HR2, respectively. The plurality of bonding pads BP in the pad region PR1 are arranged to overlap the plurality of bonding pads BP in the pad region PR2, respectively.

Two bonding pads BP facing each other between the memory chip MC and the CMOS chip CC among the plurality of bonding pads BP provided in the semiconductor memory device 1 are bonded to each other ("bonded" in FIG. 5). As a result, the circuit in the memory chip MC and the circuit in the CMOS chip CC are electrically coupled to each other. A set of two bonding pads BP facing each other between the memory chip MC and the CMOS chip CC may have a boundary or may be integrated.

Note that the semiconductor memory device 1 may have a different structure. For example, it suffices that at least one adjacent hookup region HR is provided adjacently to the memory region MR. The semiconductor memory device 1 may include a plurality of sets of the memory region MR and the hookup region HR. In this case, a set of the sense amplifier region SR, the transfer region XR, and the peripheral circuit region PERI is appropriately provided corresponding to the arrangement of the memory region MR and the hookup region HR.

(Structure in Memory Region MR of Semiconductor Memory Device 1)

FIG. 6 is a plan view illustrating an example of a planar layout in the memory region MR of the semiconductor memory device 1 according to the first embodiment. FIG. 6 illustrates a region including one block BLK (i.e., the string units SU0 to SU4). As shown in FIG. 6, the semiconductor memory device 1 includes a plurality of slits SLT, a plurality of slits SHE, a plurality of memory pillars MP, a plurality of contacts CV, and a plurality of bit lines BL in the memory region MR.

Each of the plurality of slits SLT has a portion provided to extend along the X direction, and crosses the memory region MR and the hookup regions HR1 and HR2 along the X direction. The plurality of slits SLT are arranged in the Y direction. An insulating member is embedded in the slit SLT. Each slit SLT insulates interconnects that are adjacent to each other via the slit SLT (e.g., the word lines WL0 to WL7 and the select gate lines SGD and SGS).

Each of the plurality of slits SHE has a portion provided extending along the X direction and crosses the memory region MR. The plurality of slits SHE are arranged in the Y direction. The slit SHE divides at least the select gate line SGD. In this example, three slits SHE are arranged between any adjacent slits SLT. An insulating member is embedded in the slit SHE. Each slit SHE insulates interconnects (at least the select gate line SGD) that are adjacent to each other via that slit SLT.

Each of the plurality of memory pillars MP functions as, for example, one NAND string NS. A plurality of memory pillars MP are in, for example, a 19-row staggered arrangement in an area between two adjacent slits SLT. For example, a single slit SHE overlaps each set of the memory pillars MP in the fifth row, the memory pillars MP in the tenth row, and the memory pillars MP in the fifteenth row, counting from the top of the drawing.

Each of the plurality of bit lines BL has a portion provided to extend along the Y direction, and crosses a region provided with the plurality of blocks BLK along the Y direction. The plurality of bit lines are arranged in the X direction. Each bit line BL is arranged to overlap at least one memory pillar MP in each string unit SU. In the present example, two bit lines BL overlap each memory pillar MP.

Each contact CV is provided between one bit line BL of the plurality of bit lines BL overlapping the memory pillar MP and the memory pillar MP. The associated memory pillar MP and the bit line BL are electrically coupled to each other via a contact CV. Note that the contact CV between the memory pillar MP overlapping the slit SHE and the bit line BL is omitted. In other words, the contact CV between the memory pillar MP in contact with two different select gate lines SGD and the bit line BL is omitted.

For example, in the memory region MR, the planar layout described above is repeatedly arranged in the Y direction. A region sectioned by the slit SLT corresponds to the block BLK. In the region corresponding to the block BLK in the memory region MR, each of the regions sectioned by the slits SLT and SHE corresponds to a single string unit SU. That is, in the present example, the string units SU0 to SU3 each extending in the X direction are arranged in the Y direction for each block BLK.

Note that the planar layout in the memory region MR of the semiconductor memory device 1 may be other layouts. For example, the number of slits SHE arranged between mutually neighboring slits SLT can be freely designed. The number of string units SU formed between adjacent slits SLT may be changed based on the number of the slits SHE arranged between adjacent slits SLT. The number and arrangement of memory pillars MP provided between any adjacent slits SLT may be changed as appropriate. The number of bit lines BL that overlap each memory pillar MP can be freely designed.

Figure 7:
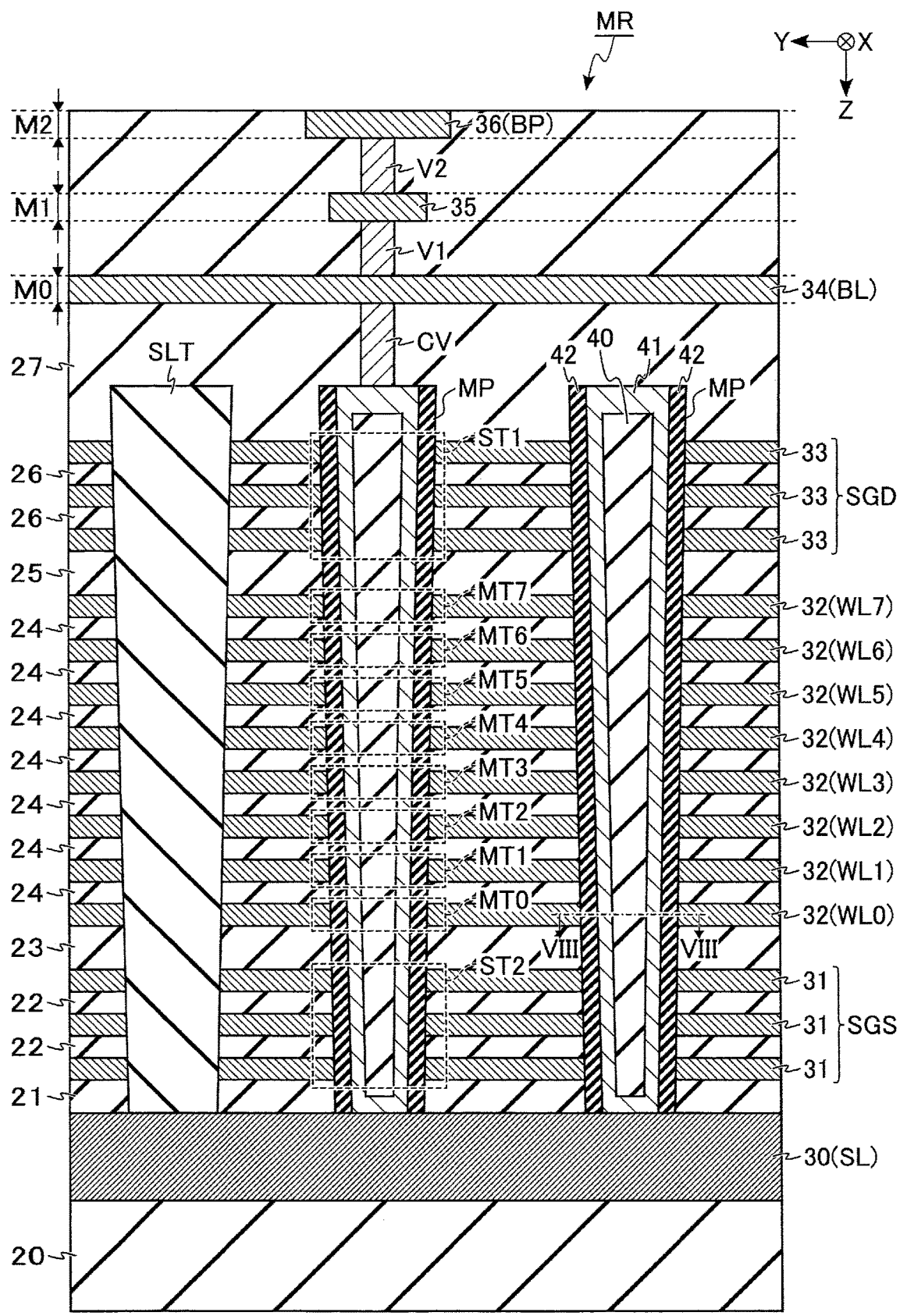
FIG. 7 is a cross-sectional view showing an example of a cross-sectional structure in a memory region of the semiconductor memory device according to the first embodiment.

FIG. 7 is a cross-sectional view showing an example of a cross-sectional structure in a memory region MR of the semiconductor memory device 1 according to the first embodiment. FIG. 7 illustrates a cross section including the memory pillar MP and the slit SLT, along the Y direction. Note that the Z direction in FIG. 7 is reversed with respect to FIG. 5. That is, in FIG. 7, the "upper side" corresponds to the lower side of the paper, and the "lower side" corresponds to the upper side of the paper. As shown in FIG. 7, the memory region MR of the semiconductor memory device 1 includes insulating layers 20 to 27, conductive layers 30 to 36, and contacts V1 and V2.

For example, the insulating layer 20 is provided in the uppermost layer of the memory chip MC. The embodiment is not limited to this example; an interconnect layer, an insulating layer, or the like may be provided on the insulating layer 20. The conductive layer 30 is provided under the insulating layer 20. Each conductive layer 30 is, for example, formed in a plate shape expanding along an XY plane, and is used as the source line SL. A metal is used as the conductive layer 30. As the metal used as the conductive layer 30, aluminum, titanium, titanium nitride, tungsten, a stacked structure of titanium nitride and aluminum, or the like can be used. As the conductive layer 30, silicide may be used. In this case, nickel silicide, titanium silicide, or the like is used as the conductive layer 30.

The insulating layer 21 is provided under the conductive layer 30. The conductive layers 31 and the insulating layers 22 are alternately provided under the insulating layer 21. The conductive layer 31 is formed in a plate shape extending along the XY plane, for example. In the present example, the plurality of conductive layers 31 are used as the select gate lines SGS. The conductive layer 32 includes, for example, tungsten. The select gate line SGS may be constituted by one conductive layer 32 or may be configured to be able to apply different voltages to the conductive layer 32 of the uppermost layer and the other conductive layers 32. The uppermost conductive layer 32 and the other conductive layers 32 may be constituted by different conductors. The distance between the conductive layer 30 and the uppermost conductive layer 31 is preferably designed to be equal to or less than 50 nm.

The insulating layer 23 is provided under the lowermost conductive layer 31. The conductive layers 32 and the insulating layers 24 are alternately provided under the insulating layer 23. Each of the conductive layers 32 is formed in a plate-like shape expanding along the XY plane. The stacked conductive layers 32 are used as word lines WL0 to WL7 in the named order from the conductive layer 30 side. The conductive layer 32 includes, for example, tungsten.

The insulating layer 25 is provided under the lowermost conductive layer 32. The conductive layers 33 and the insulating layers 26 are alternately provided under the insulating layer 25. The conductive layer 33 is formed in a plate shape extending along the XY plane, for example. In the present example, the plurality of conductive layers 33 are used as the select gate lines SGD. The conductive layer 33 includes, for example, tungsten. The select gate line SGD may be constituted by a single conductive layer 33.

The insulating layer 27 is provided under the lowermost conductive layer 33. The conductive layer 34 is provided under the insulating layer 27. The conductive layer 34 is, for example, formed in a linear shape extending in the Y direction, and is used as a bit line BL. Namely, the plurality of conductive layers 34 are arranged in the X direction in an unillustrated area. The conductive layers 34 contain, for example, copper. The interconnect layer in which the conductive layer 34 is provided is called, for example, "M0".

Each memory pillar MP extends along the Z direction, and penetrates the insulating layers 21 to 26 and the conductive layers 31 to 33. An upper portion of the memory pillar MP is in contact with the conductive layer 30. A lower portion of the memory pillar MP is in contact with the conductive layer 27. Each memory pillar MP includes, for example, a core member 40, a semiconductor layer 41, and a deposited film 42.

The core member 40 is provided so as to extend along the Z direction. The upper end of the core member 40 is provided at the height of the insulating layer 21. The lower end of the core member 40 is provided at the height of the insulating layer 27. The semiconductor layer 41 covers the core member 40. An upper portion of the semiconductor layer 41 is in contact with the conductive layer 30. A contact portion between the semiconductor layer 41 and the conductive layer 30 forms a Schottky junction. The lower portion of the semiconductor layer 41 is formed in a separate process from the upper portion and the side portion of the semiconductor layer 41. The stacked film 42 covers the side surface of the semiconductor layer 41. The stacked film 42 may be provided at least between each of the conductive layers 31 to 33 and the semiconductor layer 41.

The core member 40 includes, for example, an insulator such as silicon oxide. The semiconductor layer 41 is, for example, non-doped silicon or silicon of a low impurity concentration (for example, $10^{19}$ (atoms/cm$^3$) or less). A portion where the memory pillar MP and the plurality of conductive layers 31 (select gate line SGS) intersect functions as a select transistor STS. A portion where the memory pillar MP and the conductive layer 32 (word line WL) intersect functions as a memory cell transistor MT. A portion where the memory pillar MP and the plurality of conductive layers 33 (select gate line SGD) intersect functions as a select transistor STD.

A columnar contact CV is provided under the semiconductor layer 41 of each memory pillar MP. In the illustrated region, a contact CV corresponding to one memory pillar MP, among two memory pillars MP, is depicted. To the memory pillar MP to which the contact CV is not coupled in the region, the contact CV is coupled in an unillustrated region. A single conductive layer 34 (bit line BL) is in contact with the lower surface of the contact CV.

A columnar contact V1 is provided on the conductive layer 34. The conductive layer 35 is provided under the contact V1. Note that the conductive layers 34 and 35 are electrically coupled via the contact V1. The conductive layer is an interconnect used for coupling circuits in the semiconductor memory device 1. The interconnect layer in which the conductive layer 35 is provided is called, for example, "M1".

A columnar contact V2 is provided on the conductive layer 35. The conductive layer 36 is provided under the contact V2. The conductive layers 35 and 36 are electrically coupled via the contact V2. The conductive layer 36 is in contact with the interface of the memory chip MC and used as a bonding pad BP. The conductive layers 36 contain, for example, copper. The interconnect layer in which the conductive layer 36 is provided is called, for example, "M2".

At least a portion of the structure embedded in the slit SLT is formed in a plate shape extending along the XZ plane, and splits the insulating layers 21 to 26 and the conductive layers 31 to 33. In the slit SLT, at least a portion in contact with each of the conductive layers 31 to 33 is constituted by an insulator. The lower end of the slit SLT is provided at the height of the insulating layer 27. The upper end of the slit SLT is in contact with the conductive layer 30, for example.

Figure 8:
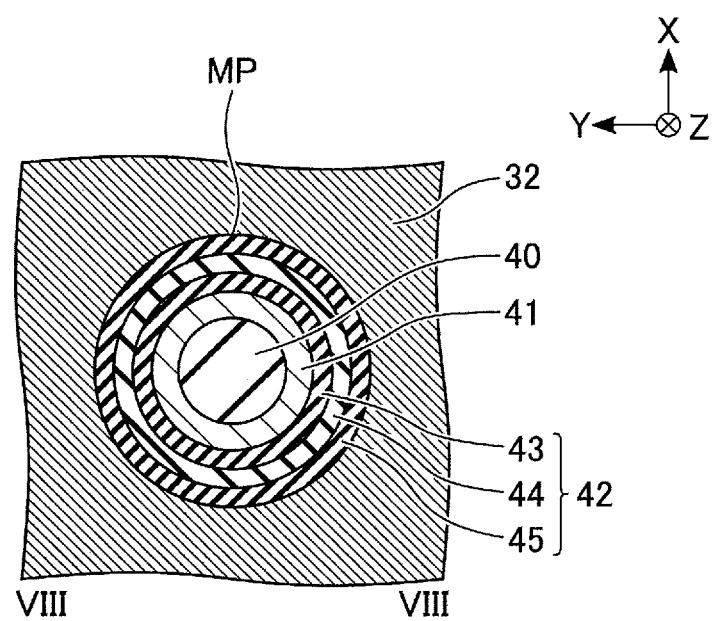
FIG. 8 is a cross-sectional view taken along line VIII-VIII of FIG. 7, showing an example of a cross-sectional structure of a memory pillar in the semiconductor memory device according to the first embodiment.

FIG. 8 is a cross-sectional view taken along line VIII-VIII of FIG. 7, illustrating an example of a cross-sectional structure of the memory pillar MP in the semiconductor memory device 1 according to the first embodiment. FIG. 8 illustrates a cross section which includes the memory pillar MP and the conductive layer 32 and which is parallel to the substrate of the semiconductor memory device 1. As shown in FIG. 8, the stacked film 42 includes, for example, a tunnel insulating film 43, an insulating film 44, and a block insulating film 45. In the layer that includes the conductive layer 32, the core member is provided in the middle of the memory pillar MP. The semiconductor layer 41 surrounds the side surface of the core member 40. The tunnel insulating film 43 surrounds the side surface of the semiconductor layer 41. The insulating film 44 surrounds the side surface of the tunnel insulating film 43. The block insulating film 45 surrounds the side surface of the insulating film 44. A conductive layer 32 surrounds the side surface of the block insulating film 45.

The semiconductor layer 41 is used as a channel (current path) for the memory cell transistors MT0 to MT7 and the select transistors STD and STS. Each of the tunnel insulating film 43 and the block insulating film 45 contains, for example, silicon oxide. The insulating film 44 is used as a charge storage layer of the memory cell transistors MT, and contains silicon nitride, for example. Each memory pillar MP thus functions as a single NAND string NS.

(Structure in Sense Amplifier Region SR of Semiconductor Memory Device 1)

FIG. 9 is a cross-sectional view illustrating an example of a cross-sectional structure in the memory region MR and the sense amplifier region SR of the semiconductor memory device 1 according to the first embodiment. As shown in FIG. 6, the memory device 1 includes a substrate 50, conductive layers GC and 51 to 54, and columnar contacts CS and C0 to C3 in the sense amplifier region SR.

The semiconductor substrate 50 is used for forming a CMOS chip CC. The semiconductor substrate 50 includes, for example, a P-type impurity. Further, the semiconductor substrate 50 includes a plurality of well regions (not shown). For example, a transistor is formed in each of the plurality of well regions. The plurality of well regions are separated by, for example, shallow trench isolations (STI).

In the sense amplifier region SR, a conductive layer GC is provided on the semiconductor substrate 50 with a gate insulating film being interposed therebetween. The conductive layer GC in the sense amplifier region SR is used as a gate electrode of the transistor Tr included in the bit line coupling unit BLHU. A contact C0 is provided on the conductive layer GC corresponding to the gate of the transistor Tr. Two contacts CS are provided on the semiconductor substrate 50 corresponding to the source and the drain of the transistor Tr. For example, the upper surfaces of the contacts CS and C0 are aligned with each other. One conductive layer 51 is provided on each of the contact CS and the contact C0.

A contact C1 is provided on the conductive layer 51. A conductive layer 52 is provided on the contact C1. The conductive layers 51 and 52 are electrically coupled via the contact C1. A contact C2 is provided on the conductive layer 52. A conductive layer 53 is provided on the contact C2. The conductive layers 52 and 53 are electrically coupled via the contact C2. A contact C3 is provided on the conductive layer 53. A conductive layer 54 is provided on the contact C3. The conductive layers 53 and 54 are electrically coupled via the contact C3. For example, interconnect layers in which the conductive layers 51 to 54 are provided will be referred to as "D0", "D1", "D2", and "D3", respectively.

The conductive layer 54 is in contact with the interface of the CMOS chip CC and is used as a bonding pad BP. The conductive layer 54 in the sense amplifier region SR is bonded to the conductive layer 37 (the bonding pad BP of the memory chip MC) in the memory region MR arranged facing the conductive layer 54. Each of the conductive layers 54 in the sense amplifier region SR is electrically coupled to one bit line BL. The conductive layer 54 contains, for example, copper. Although illustration is omitted, a plurality of transistors having the same structure as the transistor Tr are provided in the sense amplifier region SR.

Note that the cross-section structure in the memory region MR and the sense amplifier region SR of the semiconductor memory device 1 may be other structures. The number of interconnect layers provided in the CMOS chip CC can be designed to be an arbitrary number. The contact coupled to each of the conductive layers 51 to 53 may be omitted as appropriate depending on the design of the circuit. The layout of the interconnect for coupling the circuit in the memory chip MC and the circuit in the CMOS chip CC can be changed as appropriate.

<1-2> Manufacturing Method

Figure 10:
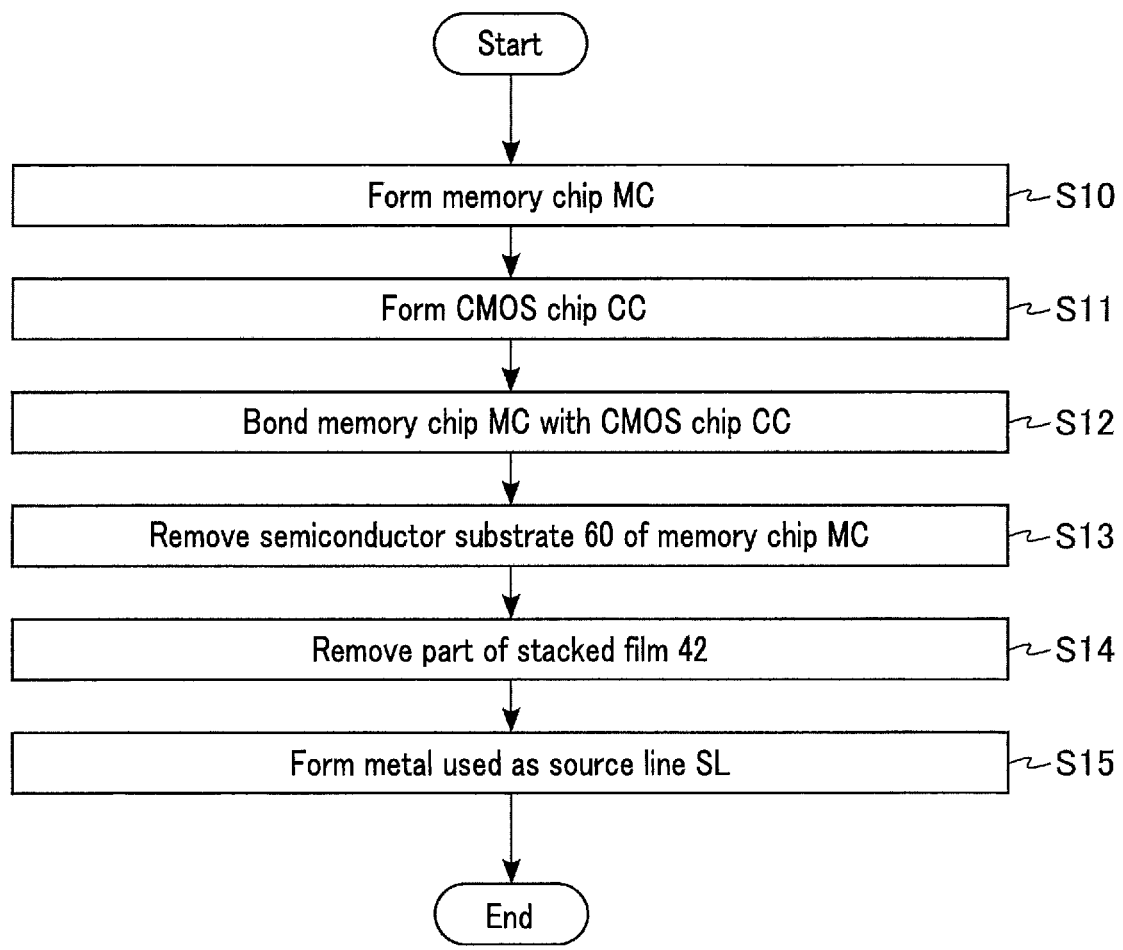
FIG. 10 is a flowchart showing an example of a method for manufacturing a semiconductor memory device according to the first embodiment.

FIG. 10 is a flowchart showing an example of a manufacturing method of the semiconductor memory device 1 according to the first embodiment. FIGS. 11 to 14 are a cross-sectional view illustrating an example of a cross-sectional structure during manufacturing of the semiconductor memory device 1 according to the first embodiment. FIGS. 11 to 14 show the structure of a cross section that includes the region shown in FIG. 7. Hereinafter, a method of forming a source line SL in the semiconductor memory device 1 according to the first embodiment will be described with reference to FIG. 10 as appropriate.

First, as shown in FIG. 11, the memory chip MC is formed (step S10). The memory chip MC is formed using the semiconductor substrate 60. The insulating layers 20 to 27, the conductive layers 30 to 36, and the contacts CV, V1, and V2, which were described with reference to FIG. 7, are formed on the substrate 60. The bottom of the memory pillar MP is in contact with the semiconductor substrate 60. The conductive layers 31 to 33 are formed by a replacement process using the slits SLT. Briefly, in the replacement process, after sacrificial members and insulating layers are alternately stacked, a stacked body that includes the sacrificial members and the insulating layers is divided by the slits SLT. Then, the sacrificial members are removed via the slits SLT, and a space from which the sacrificial members have been removed is buried with a conductive layer. Thereafter, each slit SLT is embedded with an insulator, for example.

Next, the CMOS chip CC is formed (step S11). The memory chip MC and the CMOS chip CC are formed using different semiconductor substrates (wafers). Specifically, the memory chip MC is formed using the semiconductor substrate 60, and the CMOS chip CC is formed using the semiconductor substrate 50. Therefore, the step of forming the memory chip MC and the step of forming the CMOS chip CC may be interchanged or performed in parallel.

Next, as shown in FIG. 12, the memory chip MC and the CMOS chip CC are bonded together (step S12). Specifically, the manufacturing apparatus brings the memory chip MC and the CMOS chip CC into contact with each other in a state in which the plurality of bonding pads BP exposed on the memory chip MC and the plurality of bonding pads BP exposed on the CMOS chip CC face each other in the Z direction. Thereafter, the bonding pads BP facing each other are bonded to each other by performing a heat treatment. Thus, the bonding pads BP facing each other are electrically coupled to each other.

Figure 13:
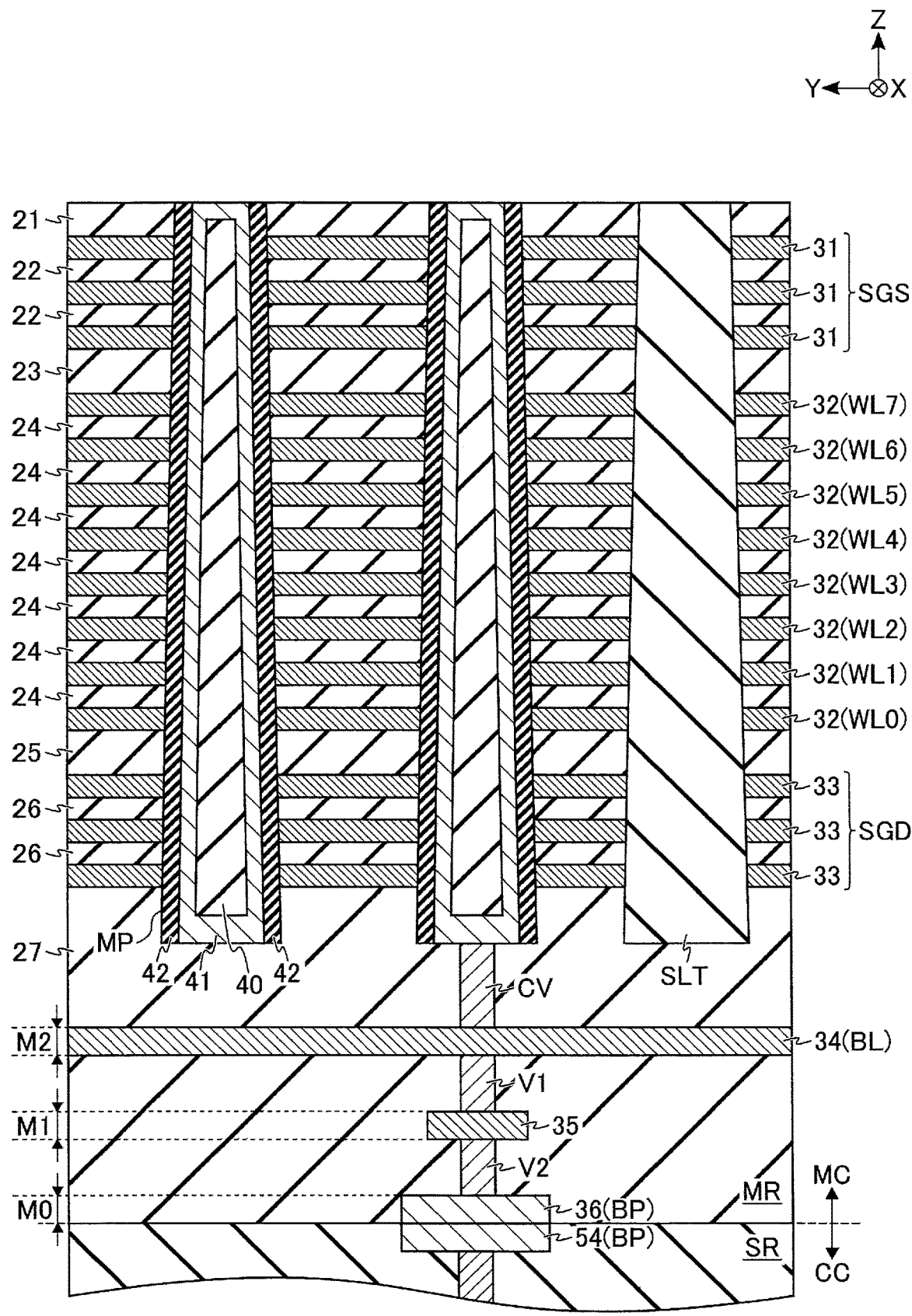

Next, the semiconductor substrate 60 of the memory chip MC is removed (step S13), and a portion of the stacked film 42 of each memory pillar MP is removed (step S14). Then, as shown in FIG. 13, a structure in which the semiconductor layer 41 is exposed at the bottom of each memory pillar MP is formed. The semiconductor substrate 60 is removed by mechanical or chemical polishing. The processes of steps S13 and S14 may be performed collectively or may be performed by different processes.

Figure 14:
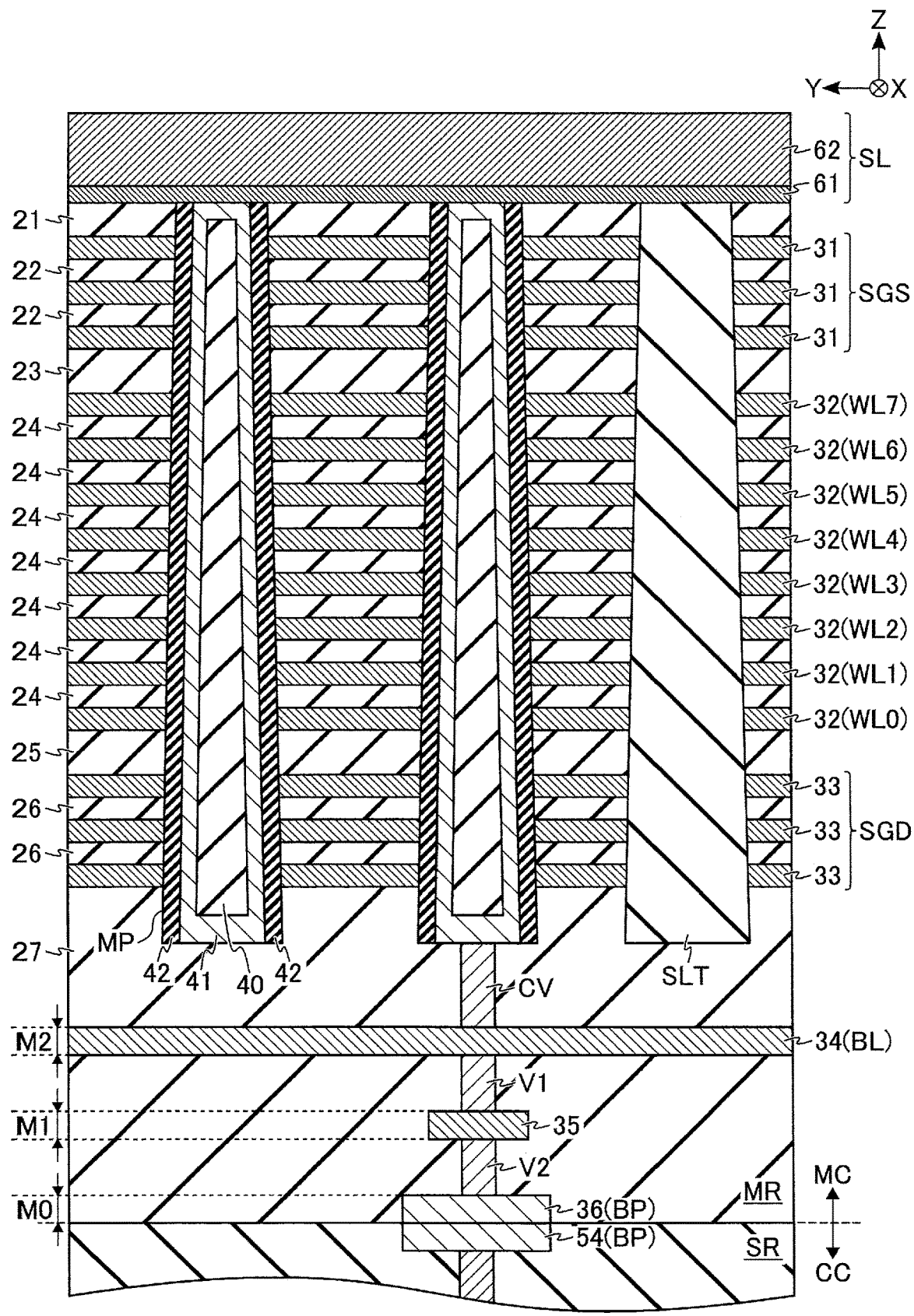

Next, as shown in FIG. 14, metals used as source lines SLs are formed (step S15). In the present example, a conductive layer 61 and a conductive layer 62 are formed in order on the insulating layer 21 and the bottom portion of each memory pillar MP. The conductive layer 61 is, for example, titanium nitride. The conductive layer 62 is, for example, aluminum. The metal used as the source line SL is formed at a low temperature of, for example, 400° C. or lower. A set of the conductive layers 61 and 62 functions as a part of the source line SL and is coupled to the bottom portion of the semiconductor layer 41 of each memory pillar MP.

As described above, a structure in which the source line SL and the semiconductor layer 41 in the memory pillar MP are electrically coupled is formed. Thereafter, the insulating layer 20 is formed on the conductive layer 62, and processes related to a formation of contacts coupled to the source line SL and a formation of a pad are performed as appropriate. The manufacturing steps described in the above are merely examples. Another step may be inserted between the manufacturing steps.

<1-3> Operation

Hereinafter, an example of each of the read operation and the erase operation of the semiconductor memory device 1 according to the first embodiment will be described. Note that, in the following description, voltages applied to various interconnects are appropriately denoted by only reference numerals. A block BLK that is a target for an operation is referred to as a "selected block BLK", and the block BLK that is not a target for an operation is referred to as a "non-selected block BLK". The word line WL that is a target for an operation is referred to as a "selected word line WL", and the word line WL that is not a target for an operation is referred to as a "non-selected word line WL". The voltages applied to the various interconnects and nodes are generated by the driver module 14 and applied via the row decoder module 15 and the like.

<1-3-1> Read Operation

Figure 15:
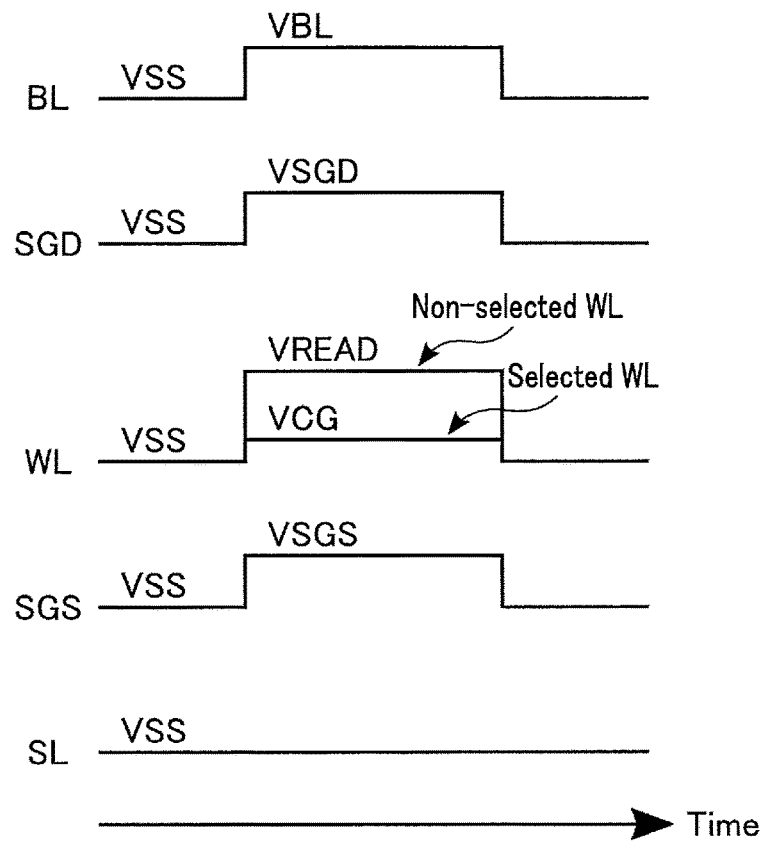
FIG. 15 is a timing chart showing an example of a read operation of the semiconductor memory device according to the first embodiment.

FIG. 15 is a timing chart showing an example of a read operation of the semiconductor memory device 1 according to the first embodiment. FIG. 15 illustrates voltages of the bit line BL, the select gate line SGD, the selected word line WL, the non-selected word line WL, the select gate line SGS, and the source line SL. As shown in FIG. 15, before the start of a read operation, the voltage of each of the bit line BL, the select gate line SGD, the selected word line WL, the non-selected word line WL, the select gate line SGS, and the source line SL is, for example, the ground voltage VSS.

When a read operation is started, VBL is applied to the bit line BL, VSGD is applied to the select gate line SGD, VCG is applied to the selected word line WL, VREAD is applied to the non-selected word line WL, and VSGS is applied to the select gate line SGS. VBL is a voltage higher than VSS. VSGD and VSGS are voltages that respectively turn on the select transistors STD and STS of the selected block BLK in the read operation. VCG is a read voltage for determining data stored in the memory cell transistor MT. The memory cell transistor MT to which VCG is applied is turned on or off in accordance with a threshold voltage that is set for each data to be stored. VREAD is a voltage that turns on the memory cell transistor MT regardless of data to be stored.

When any of the above-described voltages is applied, a channel of the NAND string NS is formed. Then, a channel current flows according to the threshold voltage of the memory cell transistor MT coupled to the selected word line WL. In the sense amplifier unit SAU, the voltage of the sense node changes according to the state of the NAND string NS. Then, when the sequencer 13 asserts the control signal STB, each sense amplifier unit SAU determines the threshold voltage of the memory cell transistor MT based on the voltage of the sense node. The semiconductor memory device 1 determines read data based on the determination result of the threshold voltage. When the read operation is finished, the state of each interconnect is returned to the state before the start of the read operation.

Figure 16:
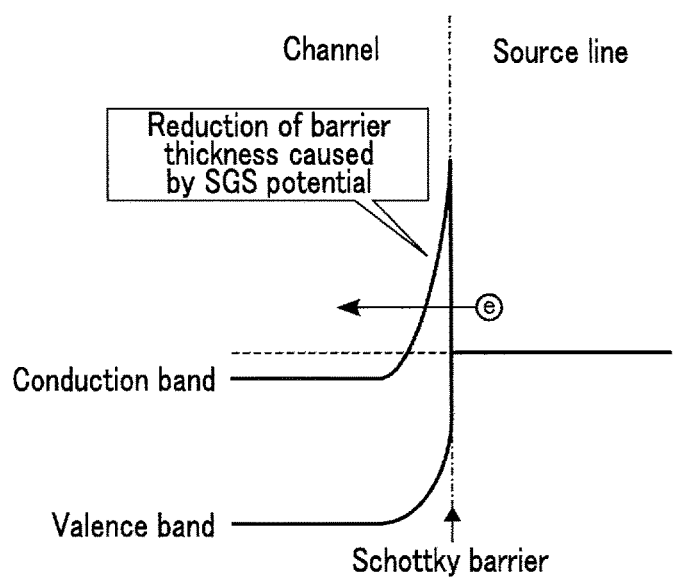
FIG. 16 is a schematic diagram showing an example of a band structure in a NAND string at the time of a read operation of the semiconductor memory device according to the first embodiment.

FIG. 16 is a schematic diagram illustrating an example of a band structure in the NAND string during a read operation in the semiconductor memory device according to the first embodiment. In FIG. 16, the vertical axis represents energy and the horizontal axis represents a region from the channel of the NAND string NS to the source line SL. As shown in FIG. 16, a Schottky barrier is formed between the channel of the NAND string NS and the source line SL. In a read operation, VREAD is applied to the non-selected word line WL, and VSGD and VSGS are applied to the select gate lines SGD and SGS, respectively, thereby lowering the energy of the conduction band.

Thus, the thickness of the Schottky barrier formed between the channel and the source line SL is reduced. Then, electrons ("e" illustrated in FIG. 16) are supplied from the source line SL toward the channel of the NAND string NS. That is, in a read operation in the semiconductor memory device 1 according to the first embodiment, a reverse bias with respect to the Schottky junction is applied, and a tunnel current from the source line SL toward the channel is used.

<1-3-2> Erase Operation

FIG. 17 is a timing chart showing an example of an erase operation in the semiconductor memory device according to the first embodiment. FIG. 17 illustrates voltages of the bit line BL, the select gate line SGD, the selected word line WL, the non-selected word line WL, the select gate line SGS, and the source line SL. As shown in FIG. 17, before the start of an erase operation, the voltage of each of the bit line BL, the select gate line SGD, the selected word line WL, the non-selected word line WL, the select gate line SGS, and the source line SL is, for example, the ground voltage VSS.

When the erase operation starts, the sequencer 13 turns off the transistor Tr of the bit line coupling unit BLHU to cut off the current path between the bit line BL and the sense amplifier unit SA. The sequencer 13 sets each of the select gate lines SGS and SGD and the word line WL corresponding to the non-selected block BLK to be in a floating state. Thereafter, the sequencer 13 raises the voltage of each of the bit line BL and the source line SL to the erase voltage VERA, and maintains the voltage of the word line WL in the selected block BLK at VISO. VERA is a high voltage that is higher than VSS and is used in an erase operation. VISO is a voltage lower than VERA and is, for example, the same voltage as VSS. When the voltage of the bit line BL is raised to VERA, a high electric field region is formed in a portion where the select transistor STD is formed. As a result, holes are generated by gate-induced-drain-leakage (GIDL) in the vicinity of the select transistor STD, and the holes are injected into the channel in the memory pillar MP.

As the voltages of the bit line BL and the source line SL are raised to VERA, the voltage of the channel in the memory pillar MP (the semiconductor layer 41) increases. Then, the voltage of each of the select gate lines SGD and SGS and the word line WL corresponding to the non-selected block BLK increases according to the increase in the voltage of the channel. For example, the voltage of each of the select gate lines SGD and SGS is raised to VSGERA, and the voltage of the word line WL corresponding to the non-selected block BLK is raised to VWLERA.

On the other hand, the word line WL corresponding to the selected block BLK is maintained at VISO. For this reason, in the selected block BLK, a voltage difference occurs between the control gate and the channel of the memory cell transistor MT. In other words, a voltage gradient is formed between the high channel voltage and the low word line WL voltage. Then, holes in the channel are injected into the charge storage layer (insulating film 44), and recoupling of electrons held in the charge storage layer and the injected holes occurs based on the written data. As a result, the threshold voltage of the memory cell transistor MT decreases, and the data stored in the memory cell transistor MT is erased. When the erase operation is completed, the state of each interconnect is returned to the state before the start of the erase operation.

FIG. 18 is a schematic diagram showing an example of a band structure in the NAND string at the time of an erase operation of the semiconductor memory device 1 according to the first embodiment. In FIG. 18, the vertical axis represents energy and the horizontal axis represents a region from the bit line BL to the source line SL. As shown in FIG. 18, a Schottky barrier is formed between the channel of the NAND string NS and the source line SL. In the erase operation, when VERA is applied to the bit line BL and the source line SL, holes are generated by GIDL in the vicinity of the select gate line SGD.

Accordingly, holes generated in the vicinity of the select gate line SGD (illustrated as "h" in FIG. 18) are injected into the channel of the NAND string NS. The holes injected into the channel of the NAND string NS are used to erase the data stored in each memory cell transistor MT.

<1-4> Advantageous Effects of First Embodiment

The above described semiconductor memory device 1 according to the first embodiment can reduce the manufacturing cost of the semiconductor memory device 1. Detailed advantages of the semiconductor memory device 1 of the first embodiment will be described below.

A semiconductor memory device in which memory cells are three-dimensionally stacked includes, for example, a plurality of stacked word lines WL and a memory pillar MP penetrating the plurality of word lines WL. In such a semiconductor memory device, in order to couple the semiconductor layer 41 used as a channel in the memory pillar MP and the source line SL, for example, a process of removing the stacked film 42 provided at the bottom of a hole for forming the memory pillar MP (hereinafter referred to as a "memory hole") is performed. However, the difficulty of the process of removing the stacked film 42 provided at the bottom of the memory hole increases as the number of stacked word lines WL increases in order to increase the storage capacity.

As a method for increasing the storage capacity per unit area of the semiconductor memory device, a structure in which the memory cell array 10 and the peripheral circuit are formed using different semiconductor substrates and then the two semiconductor substrates are bonded to each other (hereinafter referred to as a bonding structure) is considered. In the bonding structure, the occupation ratio of the memory cell array 10 to the chip area of the semiconductor memory device can be increased, and the restriction on the process for each semiconductor substrate can be reduced. In the bonding structure, when a memory chip provided with the memory cell array 10 is disposed on a CMOS chip provided with a peripheral circuit, the bottom of the memory pillar MP is disposed on the upper surface side of the chip of the semiconductor memory device.

Therefore, the semiconductor memory device 1 according to the first embodiment has a structure in which the memory pillar MP and the source line SL are bonded after the memory chip MC and the CMOS chip CC are bonded. In short, when the memory chip MC is formed, the coupling between the semiconductor layer 41 in the memory pillar MP and the source line SL is omitted. Then, after the memory chip MC and the CMOS chip CC are bonded, a part of the stacked film 42 in the memory pillar MP is removed from the upper surface side of the chip, and the source line SL is formed. The source line SL and the semiconductor layer 41 in the memory pillar MP can thus be coupled.

Processing the bottom portion of the memory pillar MP from the upper surface side of the bonded chips is shallow etching processing. For this reason, the degree of difficulty of the etching process for coupling the semiconductor layer 41 to the source line SL is lower than that of the process of removing the stacked film 42 provided at the bottom of the memory hole at the time of forming the memory chip MC. As a result, the semiconductor memory device 1 according to the first embodiment can suppress the occurrence of defects stemming from the processing for coupling the source line SL to the semiconductor layer 41 in the memory pillar MP. As a result, the semiconductor memory device 1 according to the first embodiment can improve the yield and suppress the manufacturing cost.

Figure 19:
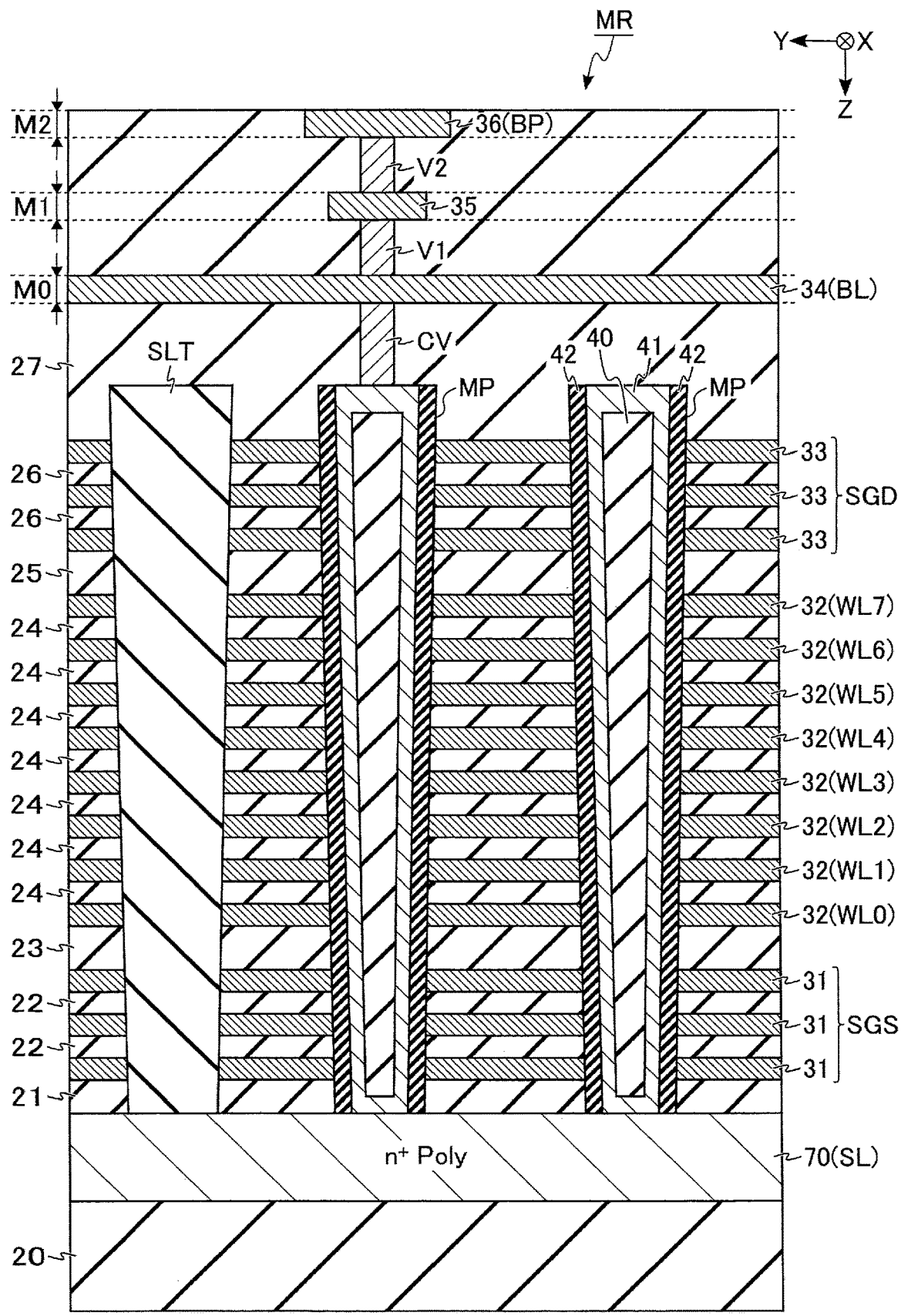
FIG. 19 is a cross-sectional view showing an example of a cross-sectional structure in a memory region of a semiconductor memory device according to a comparative example of the first embodiment.

FIG. 19 is a cross-sectional view showing an example of a cross-sectional structure in a memory region MR of a semiconductor memory device 1 according to a comparative example of the first embodiment; As shown in FIG. 19, polysilicon 70 doped with an n-type impurity (n+Poly in FIG. 19) may be used as the source line SL. When polysilicon is doped with impurities, heat treatment (hereinafter referred to as annealing treatment) for activating the doped impurities is performed.

However, the annealing treatment after the memory chip MC and the CMOS chip CC are bonded to each other may cause performance deterioration of a transistor of a peripheral circuit formed in the CMOS chip CC, occurrence of a defect due to diffusion of a specific metal (for example, copper), or the like. In the annealing process at the temperature of 400° C. or lower, which hardly affects the reliability of the bonding structure and a copper interconnect, the crystallization rate and the impurity activation rate of the polysilicon decrease. When these are insufficient, the source line SL and the contact resistance of the source line SL may increase, and the read performance may deteriorate.

On the other hand, the semiconductor memory device 1 according to the first embodiment has a bonding structure and has a configuration in which metal or silicide is used for the source line SL. In short, in the first embodiment, after the memory chip MC and the CMOS chip CC are bonded to each other, the semiconductor substrate 60 and a part of the stacked film 42 are removed, and a part of the semiconductor layer 41 is exposed. Then, the metal or silicide used as the source line SL is formed at a low temperature of 400° C. or lower. As described above, in the semiconductor memory device 1 according to the first embodiment, the source line SL is formed after the memory chip MC and the CMOS chip CC are bonded to each other, without performing a high-temperature annealing process. Thus, in the semiconductor memory device 1 according to the first embodiment, it is possible to suppress a decrease in the reliability of a copper interconnect or the like and to form the source line SL at low cost.

In the semiconductor memory device 1 according to the first embodiment, the non-doped or low impurity concentration semiconductor layer 41 (channel) and the metal or silicide source line SL are in direct contact with each other. Therefore, a Schottky barrier may be formed at a contact portion between the channel and the source line SL. In the semiconductor memory device 1 according to the first embodiment, a voltage higher than that of the source line SL is applied to the bit line BL during a read operation. Then, a sense amplifier unit SAU determines data based on a current value corresponding to the magnitude of the threshold voltage of the selected memory cell transistor MT.

In such a read operation, since a reverse bias of a Schottky junction is applied to the contact portion between the channel and the source line SL, the read current may be reduced. For example, when polysilicon having an impurity concentration of 1020 (atoms/cm$^3$) or more is used for the channel, the channel and the source line SL form an ohmic contact, and the contact resistance can be reduced. However, it is not desirable to increase the impurity concentration of the semiconductor layer 41 used for the channel because the characteristics of the on/off ratio and the threshold voltage of the memory cell transistor MT deteriorate.

To this end, in the memory device 1 according to the first embodiment, the distance between the conductive layer 30 and the uppermost conductive layer 31 is designed to be equal to or less than 50 nm. In this case, when a voltage is applied to the select gate line SGS in a read operation, a fringe electric field is generated between the select gate line SGS and the source line SL. Such a fringe electric field can form an inversion layer in the channel, and can reduce a contact resistance between the channel and the source line SL (in other words, a parasitic resistance of the channel).

As a result, the semiconductor memory device 1 according to the first embodiment can suppress a decrease in a read current in a read operation using a reverse bias of a Schottky junction, and can improve the performance of a read operation. In addition, in the semiconductor memory device 1 according to the first embodiment, since the semiconductor layer 41 (channel) can be formed in a non-doped state or with a low impurity concentration, it is possible to suppress the deterioration of the on/off ratio of the memory cell transistor MT and to optimize the threshold voltage of the memory cell transistor MT.

<2> Second Embodiment

The configurations of the semiconductor memory device 1 according to the second embodiment are similar to those of the first embodiment. The semiconductor memory device 1 according to the second embodiment performs a read operation of applying a forward bias to a Schottky junction between a channel and a source line SL. Hereinafter, the semiconductor memory device 1 according to the second embodiment will be described with respect to different points from the first embodiment.

<2-1> Read Operation

FIG. 20 is a timing chart showing an example of a read operation of the semiconductor memory device according to the second embodiment. FIG. 20 illustrates voltages of the bit line BL, the select gate line SGD, the selected word line WL, the non-selected word line WL, the select gate line SGS, and the source line SL. As shown in FIG. 20, before the start of a read operation, the voltage of each of the bit line BL, the select gate line SGD, the selected word line WL, the non-selected word line WL, the select gate line SGS, and the source line SL is, for example, the ground voltage VSS.

When a read operation is started, VSS is applied to the bit line BL, VSGD is applied to the select gate line SGD, VCG is applied to the selected word line WL, VREAD is applied to the non-selected word line WL, and VSGS is applied to the select gate line SGS. VSL is a voltage higher than VSS. In other words, the read operation of the second embodiment is performed in a state in which a voltage higher than that of the bit line BL is applied to the source line SL. While these voltages are being applied, the sequencer 13 asserts the control signal STB. Other operations of the semiconductor memory device 1 of the second embodiment are similar to, for example, those of the first embodiment.

FIG. 21 is a schematic diagram showing an example of a band structure in a NAND string at the time of a read operation of the semiconductor memory device according to the second embodiment. In FIG. 21, the vertical axis represents energy, and the horizontal axis represents a region from the channel of the NAND string NS to the source line SL. As shown in FIG. 21, a Schottky barrier is formed between the channel of the NAND string NS and the source line SL.

In the read operation of the second embodiment, since the voltage of the source line SL is higher than the voltage of the bit line BL, a forward bias is applied to the Schottky junction between the channel and the source line SL. Thus, the thickness of the Schottky barrier formed between the channel and the source line SL during a read operation is reduced in the semiconductor memory device 1 according to the second embodiment. As a result, electrons (illustrated as "e" in FIG. 16) may flow from a channel of the NAND string NS toward a source line SL.

<2-2> Advantageous Effects of Second Embodiment

As described above, in the semiconductor memory device 1 according to the second embodiment, a Schottky junction is formed in the contact portion between the semiconductor layer 41 (channel) and the source line SL, as in the first embodiment. At the time of a read operation, a voltage higher than that of the bit line BL is applied to the source line SL, and the sense amplifier unit SAD determines data based on a current value corresponding to the magnitude of the threshold voltage of the selected memory cell transistor MT. As described above, in a read operation, a forward bias of a Schottky junction is applied to the contact portion between the channel and the source line SL, thereby suppressing a decrease in a read current. As a result, the semiconductor memory device 1 according to the second embodiment can improve the performance of a read operation while suppressing the manufacturing cost of the semiconductor memory device 1 as in the first embodiment.

Note that the semiconductor memory device 1 according to the second embodiment may perform a read operation using electrons or may perform a read operation using holes. The semiconductor memory device 1 can obtain the advantageous effect described in the second embodiment as long as a read operation in which a forward bias is applied to a Schottky junction between the channel and the source line SL is performed.

<3> Third Embodiment

The semiconductor memory device 1 according to the third embodiment has a structure in which silicide is formed in the coupling portion between the semiconductor layer 41 in the memory pillar MP and the source line SL. Hereinafter, the semiconductor memory device 1 according to the third embodiment will be described with respect to different points from the first and second embodiments.

<3-1> Structure of Memory Cell Array 10

Figure 22:
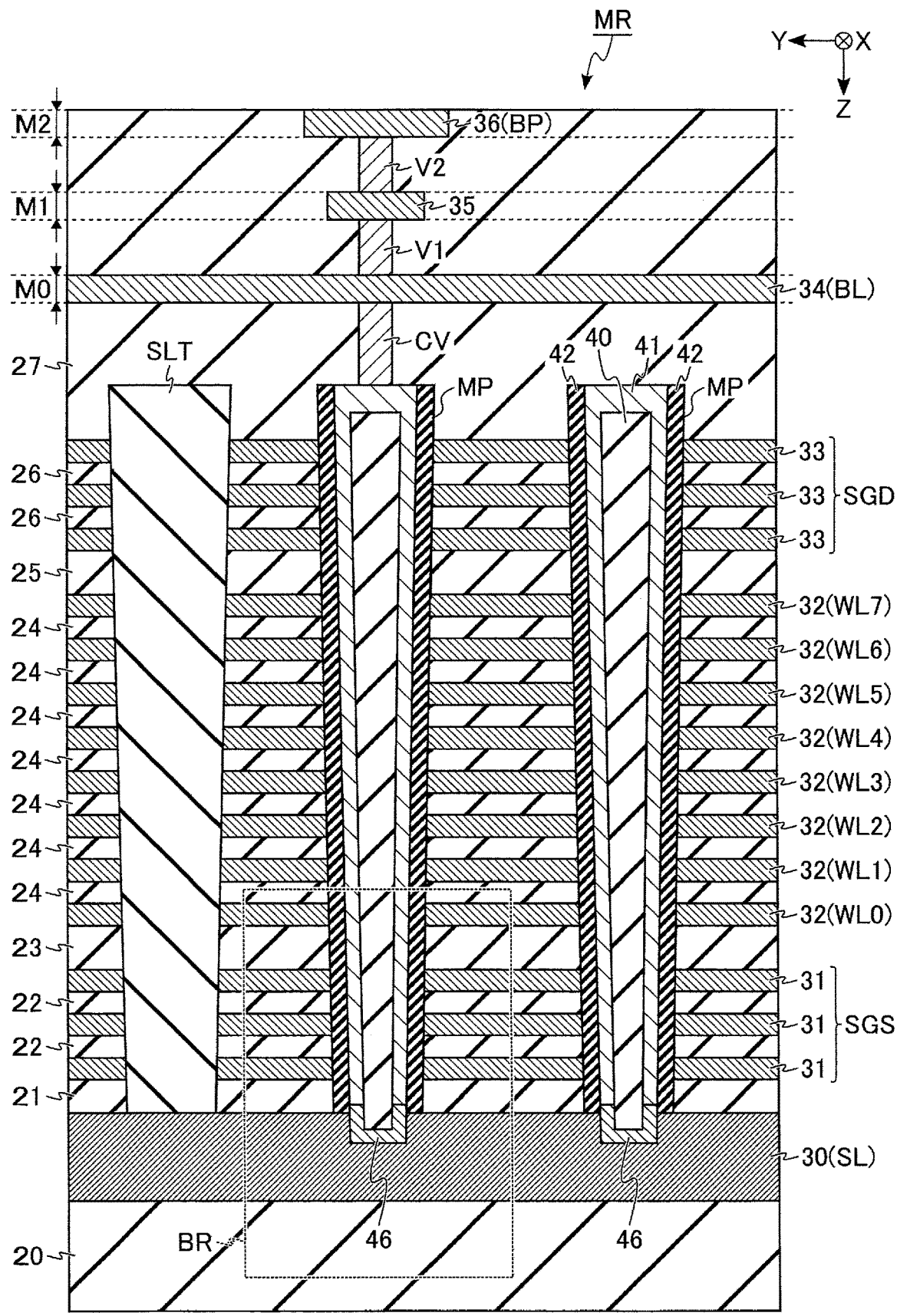
FIG. 22 is a cross-sectional view showing an example of a cross-sectional structure in a memory region of a semiconductor memory device according to a third embodiment.

FIG. 22 is a cross-sectional view showing an example of a cross-sectional structure in a memory region MR of the semiconductor memory device 3 according to the first embodiment. As shown in FIG. 22, the semiconductor memory device 1 according to the third embodiment is different from the semiconductor memory device 1 according to the first embodiment shown in FIG. 7 only in the structure of the bottom portion of the memory pillar MP. Specifically, in the third embodiment, each memory pillar MP further includes a silicide 46.

The silicide 46 covers the bottom of the core member 40. The silicide 46 is provided between the semiconductor layer 41 and the conductive layer 30 in the memory pillar MP. The silicide 46 is in contact with each of the semiconductor layer 41 and the conductive layer 30. As the silicide 46, nickel silicide, titanium silicide, or the like is used. In the third embodiment, the semiconductor layer 41 in the memory pillar MP is separated from the conductive layer 30. The silicide 46 electrically couples the conductive layer 30 and the semiconductor layer 41. The silicide 46 may be regarded as a part of the source line SL. A contact portion (boundary portion) between the silicide 46 and the semiconductor layer 41 forms a Schottky junction. The boundary portion between the silicide 46 and the semiconductor layer 41 is provided, for example, at the height of the insulating layer 21. In the third embodiment, the boundary portion between the silicide 46 and the semiconductor layer 41 may be at another position.

Figure 23:
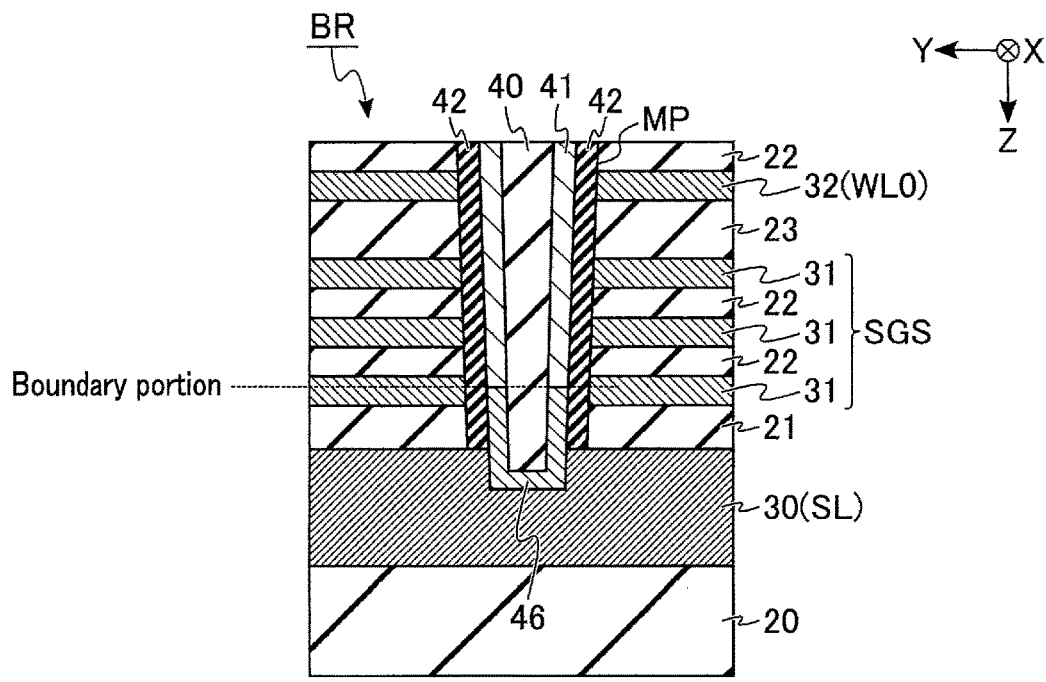
FIGS. 23 and 24 are cross-sectional views showing an example of a cross-sectional structure of a coupling portion between a memory pillar and a source line in the semiconductor memory device according to the third embodiment.
Figure 24:
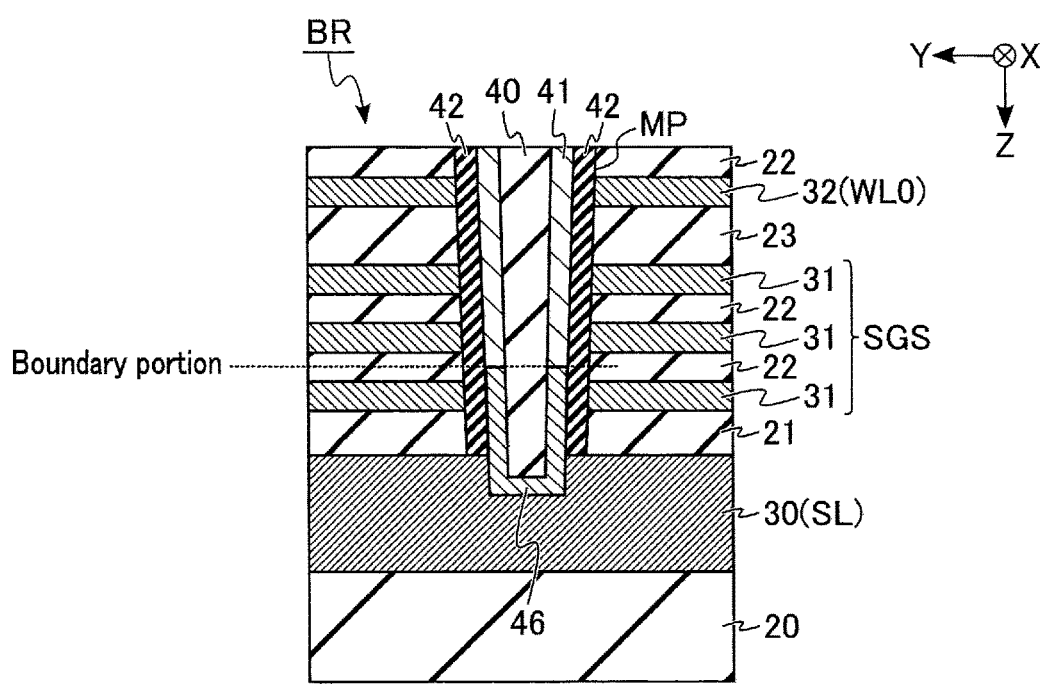

FIGS. 23 and 24 are a cross-sectional view showing an example of a cross-sectional structure of a coupling portion between a memory pillar MP and a source line SL in the semiconductor memory device 1 according to the third embodiment. Each of FIGS. 23 and 24 illustrates the bottom region BR of the memory pillar MP illustrated in FIG. 22. As shown in FIG. 23, the boundary portion between the silicide 46 and the semiconductor layer 41 may be provided at the height of the conductive layer 31. As shown in FIG. 24, the boundary portion between the silicide 46 and the semiconductor layer 41 may be provided at the height of the insulating layer 22.

In the semiconductor memory device 1 according to the third embodiment, the boundary portion between the silicide 46 and the semiconductor layer 41 may be provided at least at the height of the insulating layer 21 or the height of the insulating layer 22. In the semiconductor memory device 1 according to the third embodiment, the boundary portion between the silicide 46 and the semiconductor layer 41 is more preferably provided at the height of the conductive layer 31. Other structures of the semiconductor memory device 1 according to the third embodiment are the same as those of the first embodiment.

<3-2> Manufacturing Method

Figure 25:
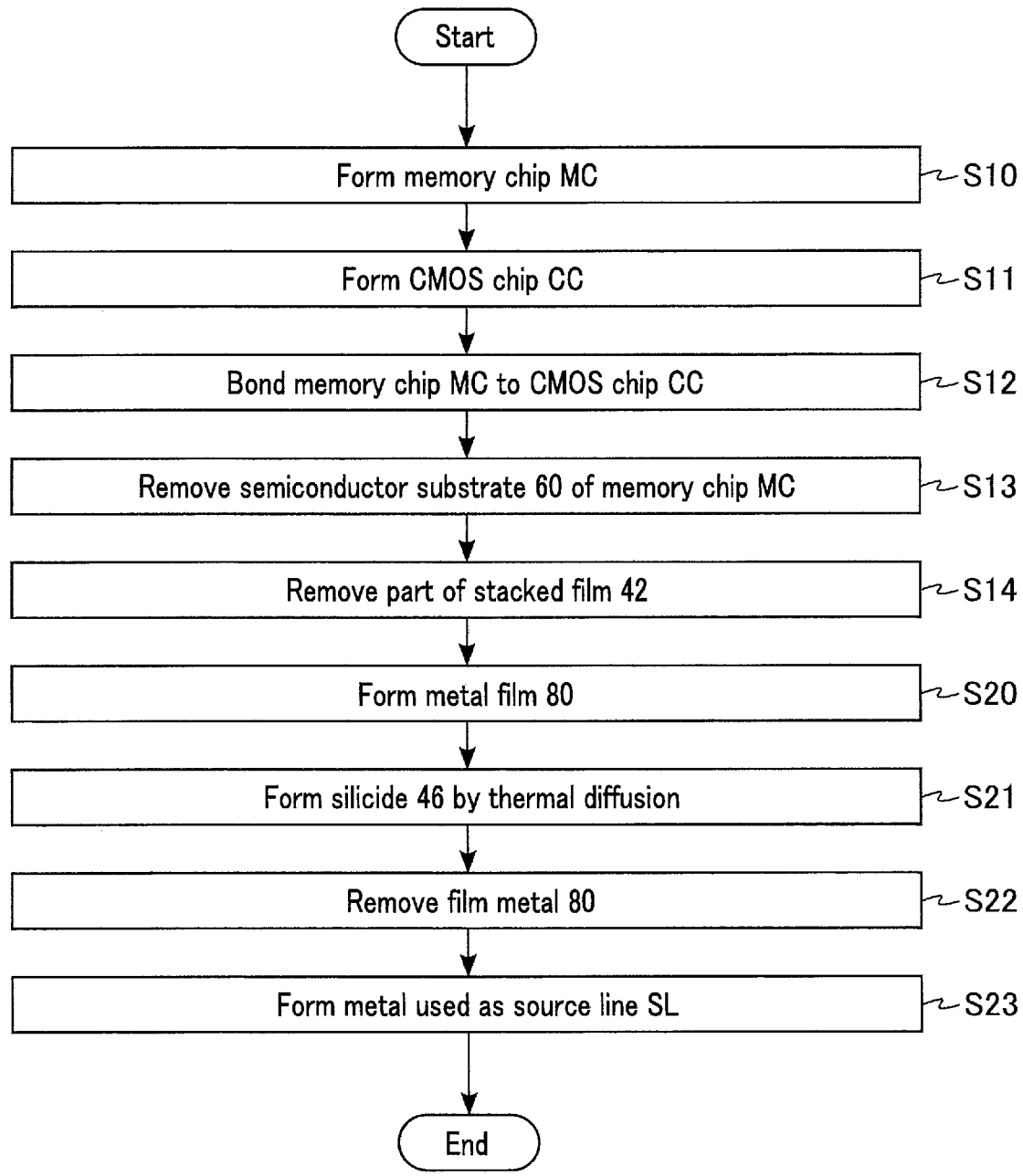
FIG. 25 is a flowchart showing an example of a method for manufacturing a semiconductor memory device according to the third embodiment.

FIG. 25 is a flowchart showing an example of a manufacturing method of the semiconductor memory device 1 according to the third embodiment. FIGS. 26 to 30 are a cross-sectional view showing an example of a cross-sectional structure during manufacturing of the semiconductor memory device 1 according to the third embodiment. FIGS. 26 to 30 show the structure of a cross section that includes the region shown in FIG. 22. Hereinafter, a method of forming a source line SL in the semiconductor memory device 3 according to the first embodiment will be described with reference to FIG. 25 as appropriate.

First, as in the first embodiment, the memory chip MC is formed (step S10), and the CMOS chip CC is formed (step S11). Then, as in the first embodiment, the memory chip MC and the CMOS chip CC are bonded together (step S12). Next, as in the first embodiment, the semiconductor substrate 60 of the memory chip MC is removed (step S13), and a part of the stacked film 42 is removed (step S14).

Figure 26:
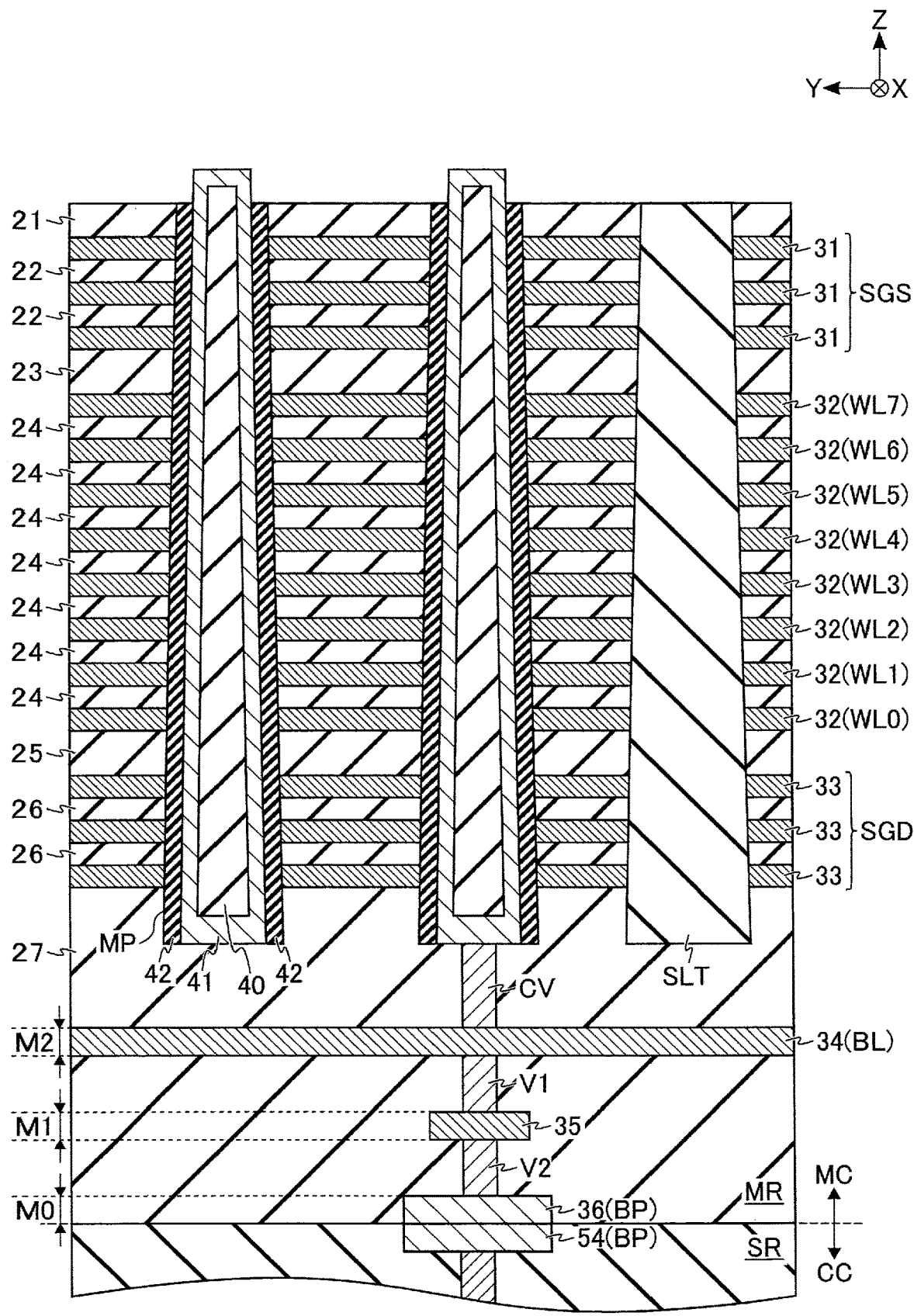

In the third embodiment, it is preferable that a structure in which the semiconductor layer 41 protrudes and is exposed at the bottom of the memory pillar MP be formed at this time, as shown in FIG. 26. In other words, the stacked film 42 at the bottom portion of the memory pillar MP is preferably removed more deeply than in the first embodiment. In this case, the height of the portion where the laminated film 42 is exposed is lower than the height of the vertex portion of the core member 40, for example. In the process of removing a part of the stacked film 42, for example, wet etching using a condition that allows selective removal of the material included in the stacked film 42 is performed. The removal of the stacked film 42 in this step is adjusted so as not to reach the conductive layer 31.

Next, as shown in FIG. 27, a metallic film 80 is formed (step S20). The metal film 80 is thereby brought into contact with the semiconductor layer 41 at the bottom of the memory pillar MP. As the metal film 80, for example, nickel is used.

Figure 28:
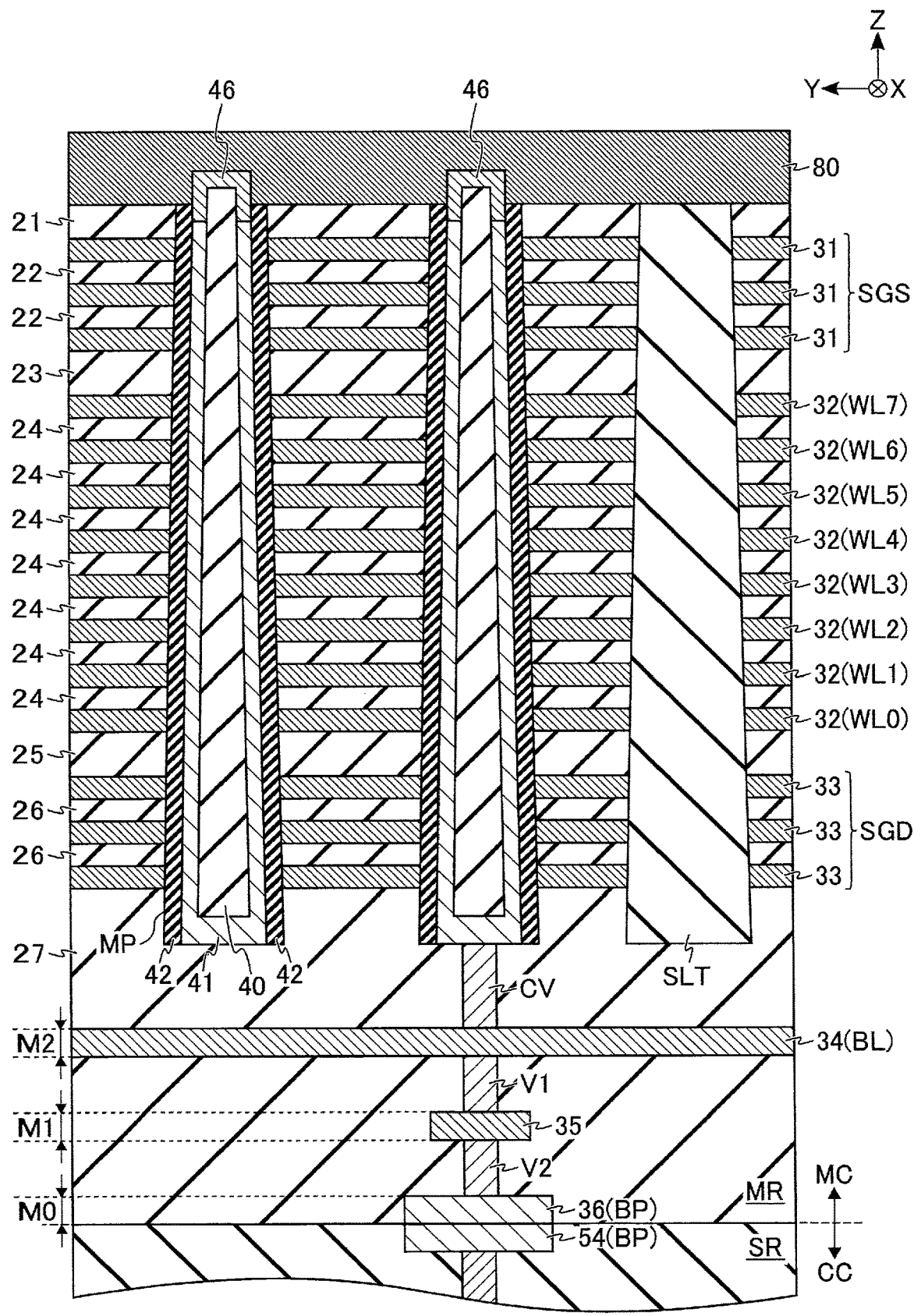

Next, as shown in FIG. 28, a silicide 46 is formed by thermal diffusion (step S21). Specifically, by performing the annealing process, metal atoms (e.g., nickel) included in the metal film 80 are diffused into the semiconductor layer 41 in the memory pillar MP. A portion where the metal atoms are diffused in the semiconductor layer 41 corresponds to the silicide 46. The diffusion range of the metal atoms may change depending on the time of the annealing treatment. Therefore, in this step, the parameters of the annealing treatment are adjusted so that the boundary portion between the semiconductor layer 41 and the silicide 46 falls within the range described with reference to FIGS. 22 to 24.

Figure 29:
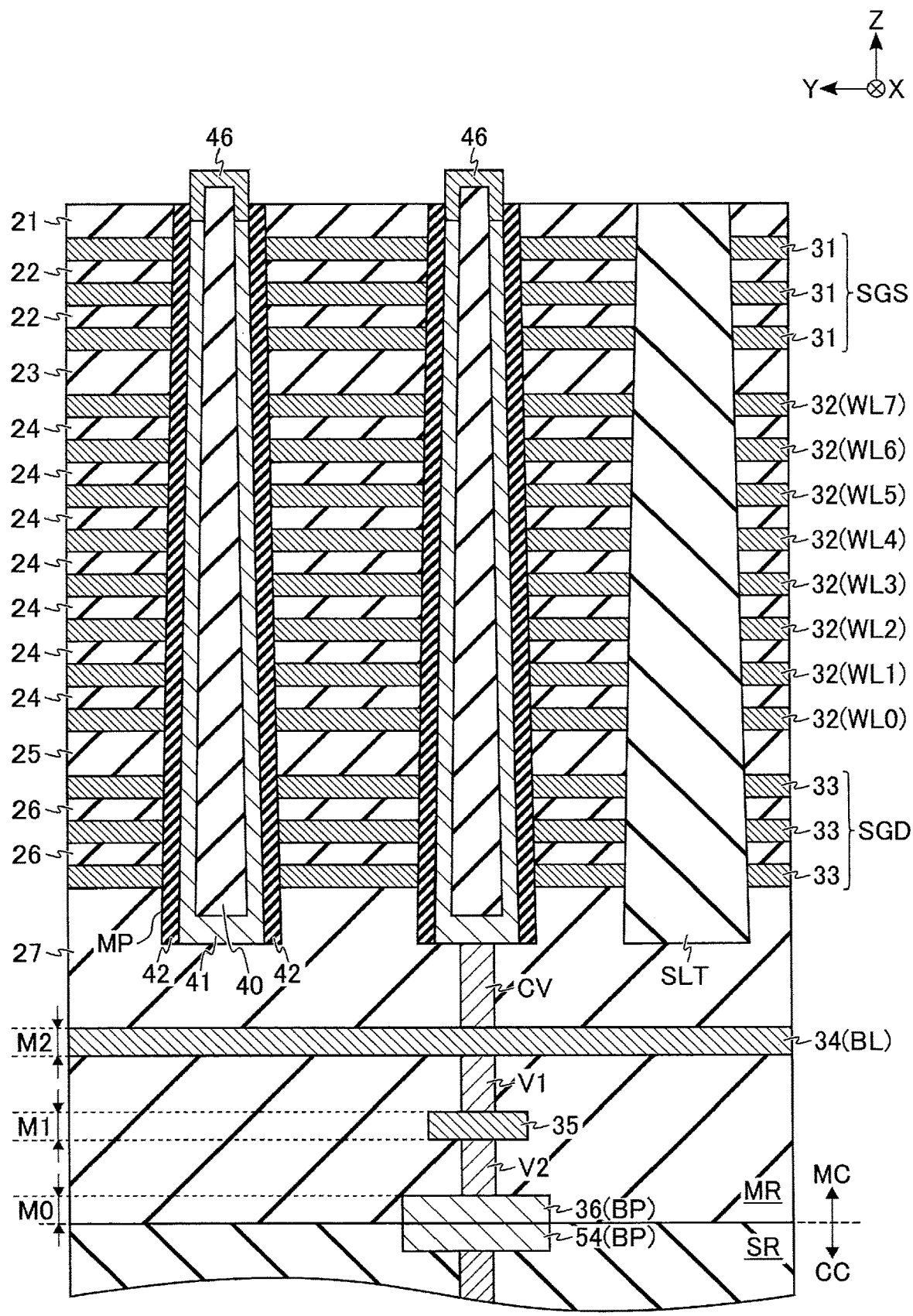

Next, as shown in FIG. 29, the metallic film 80 is removed (step S22). In this step, an etching process having a high selection ratio between the metal film 80 and the silicide 46 is performed. The metallic film 80 may remain after the process of step S22. In the third embodiment, step S22 may be omitted.

Next, as shown in FIG. 30, a metal used as the source line SL is formed (step S23). In the present example, a single-phase conductive layer 30 is formed as the source line SL. The present embodiment is not limited to this, and a stacked structure consisting of titanium nitride and aluminum may be formed similarly to the first embodiment, or another metal interconnect or silicide may be formed.

As described above, a structure in which the source line SL and the semiconductor layer 41 in the memory pillar MP are electrically coupled with the silicide 46 being interposed therebetween is formed. Thereafter, the insulating layer 20 is formed on the conductive layer 62, and processes related to a formation of contacts coupled to the source line SL and a formation of a pad are performed as appropriate. The manufacturing steps described in the above are merely examples. Another step may be inserted between the manufacturing steps.

<3-3> Advantageous Effects of Third Embodiment

As described above, in the semiconductor memory device 1 according to the third embodiment, a part of the channel (semiconductor layer 41) is replaced with the silicide 46, and the silicide 46 is coupled to the metal used as the source line SL. The silicide 46 and the metal film 80 can be coupled at a low resistance. The boundary portion between the channel and the silicide 46 forms a Schottky junction and enters the region where the semiconductor layer 41 is formed in the memory pillar MP. To be more specific, the boundary portion between the channel and the silicide 46 is arranged in the vicinity of the select gate line SGS, that is, in the vicinity of the select transistor ST2.

In such a case, during a read operation, the fringe electric field generated between the select gate line SGS and the source line SL easily reaches the boundary portion in which a Schottky junction is formed. As a result, the semiconductor memory device 1 according to the third embodiment can reduce a contact resistance between the channel and the source line SL (in other words, a parasitic resistance of the channel) more than in the first embodiment. As a result, the semiconductor memory device 1 according to the third embodiment can improve the performance of a read operation while suppressing the manufacturing cost of the semiconductor memory device 1 as in the first embodiment.

The third embodiment may be combined with either the first embodiment or the second embodiment. That is, the semiconductor memory device 1 according to the third embodiment may perform a read operation of applying a reverse bias to a Schottky junction, which is described in the first embodiment, or may perform a read operation of applying a forward bias to a Schottky junction, which is described in the second embodiment. In any case, the semiconductor memory device 1 according to the third embodiment can improve the performance of a read operation more than in the embodiment combined with the third embodiment.

<4> Fourth Embodiment

The semiconductor memory device 1 according to the third embodiment has a structure in which the coupling portion between the semiconductor layer 41 in the memory pillar MP and the source line SL is brought closer to the select gate line SGS. A description will be given of the points in which the semiconductor memory device 1 of the fourth embodiment differs from those of the first to third embodiments.

<4-1> Structure of Memory Cell Array 10

Figure 31:
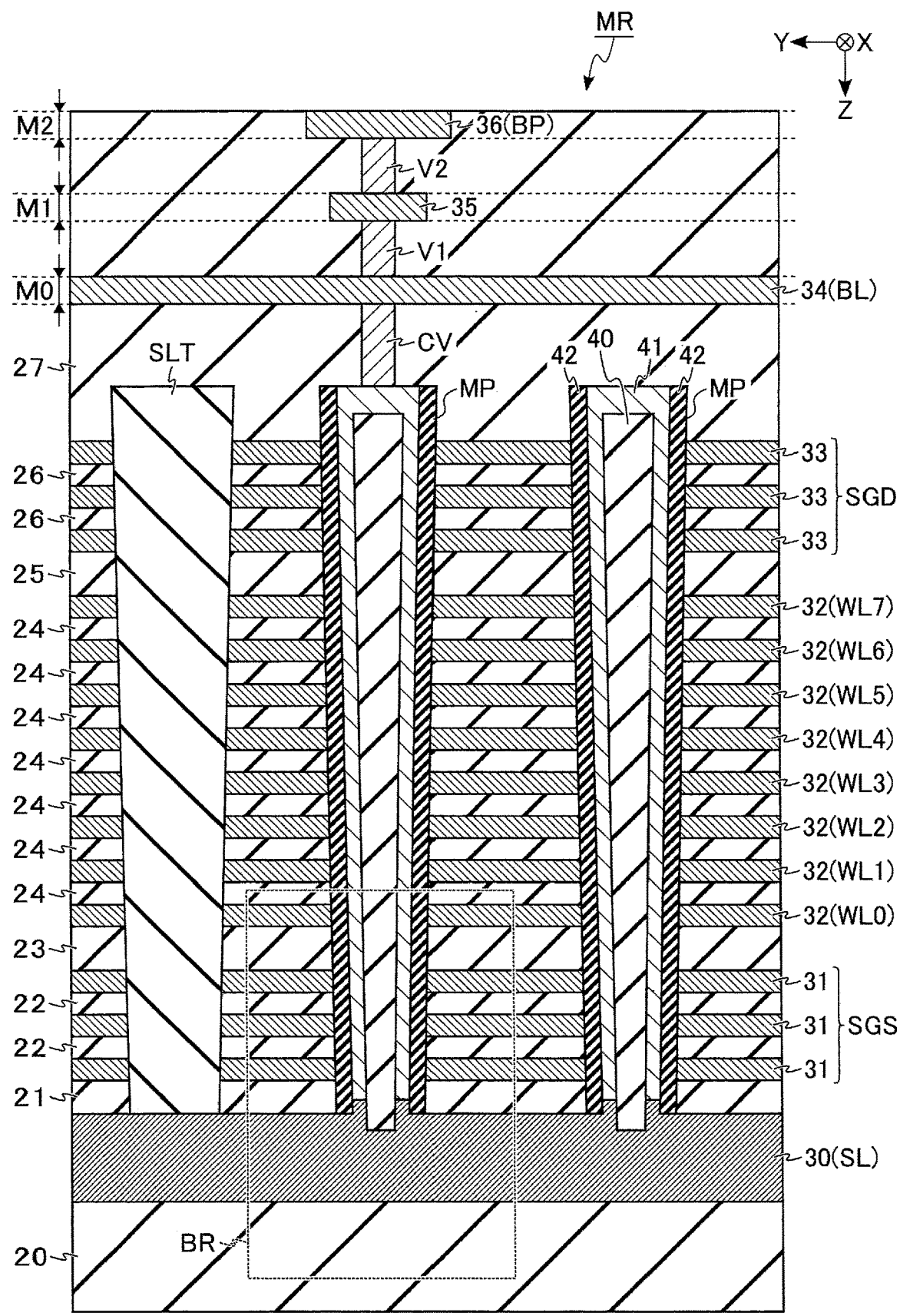
FIG. 31 is a cross-sectional view showing an example of a cross-sectional structure in a memory region of a semiconductor memory device according to a fourth embodiment.

FIG. 31 is a cross-sectional view showing an example of a cross-sectional structure in a memory region of a semiconductor memory device according to the fourth embodiment. As shown in FIG. 31, the semiconductor memory device 1 according to the fourth embodiment is different from the semiconductor memory device 1 according to the third embodiment shown in FIG. 22 only in the structure of the bottom portion of the memory pillar MP. Specifically, in the fourth embodiment, the portion where the silicide 46 is provided in the third embodiment is filled with the conductive layer 30.

Specifically, in the fourth embodiment, the conductive layer 30 covers the bottom portion of the core member 40. The conductive layer 30 has a portion provided between the core member 40 and the stacked film 42 in the memory pillar MP. A portion of the conductive layer 30 provided between the core member 40 and the stacked film 42 is in contact with the semiconductor layer 41. A contact portion (boundary portion) between the conductive layer 30 and the semiconductor layer 41 forms a Schottky junction. The boundary portion between the conductive layer 30 and the semiconductor layer 41 is provided, for example, at the height of the insulating layer 21. In the fourth embodiment, the boundary portion between the conductive layer 30 and the semiconductor layer 41 may be at another position.

Figure 32:
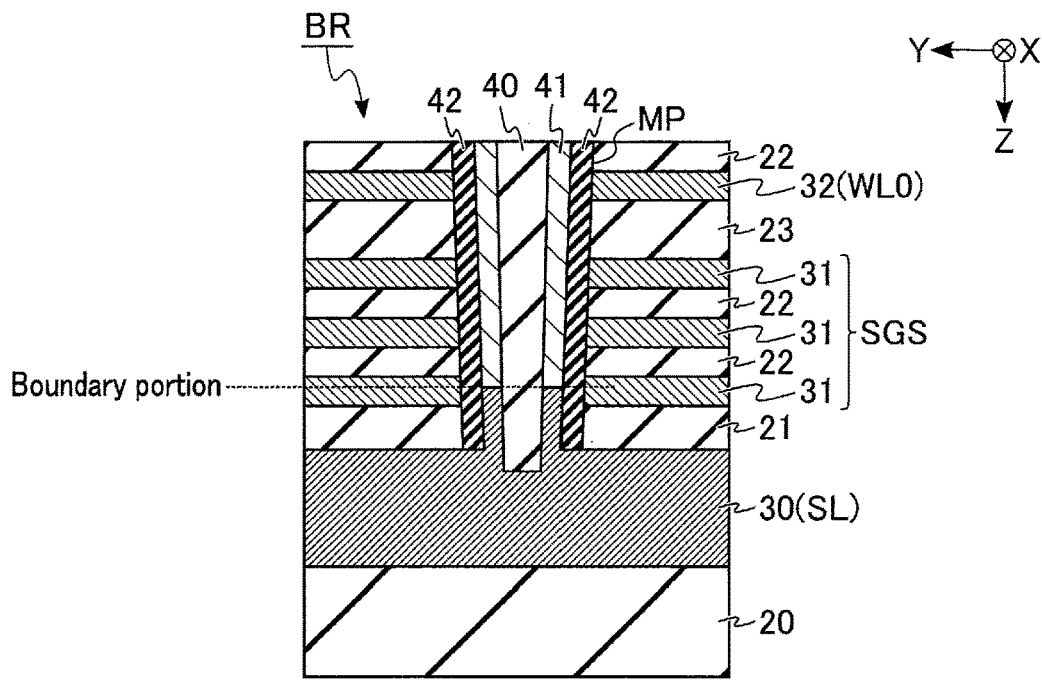
FIGS. 32 and 33 are cross-sectional views showing an example of a cross-sectional structure of a coupling portion between a memory pillar and a source line in the semiconductor memory device according to the fourth embodiment.
Figure 33:
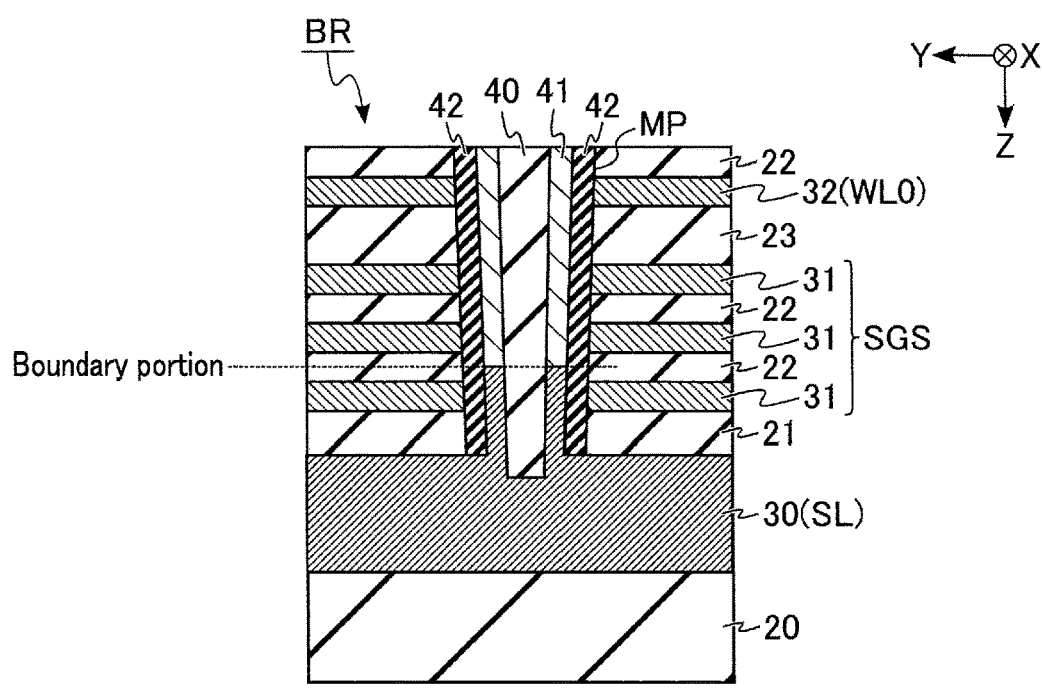

FIGS. 32 and 33 are a cross-sectional view showing an example of a cross-sectional structure of a coupling portion between a memory pillar and a source line in the semiconductor memory device according to the fourth embodiment. Each of FIGS. 32 and 33 illustrates the bottom region BR of the memory pillar MP illustrated in FIG. 31. As shown in FIG. 32, the boundary portion between the conductive layer 30 and the semiconductor layer 41 may be provided at the height of the conductive layer 31. As shown in FIG. 32, the boundary portion between the conductive layer 30 and the semiconductor layer 41 may be provided at the height of the insulating layer 22.

In the semiconductor memory device 1 according to the fourth embodiment, the boundary portion between the conductive layer 30 and the semiconductor layer 41 may be provided at least at the height of the insulating layer 21 or the height of the insulating layer 22. In the semiconductor memory device 1 according to the fourth embodiment, the boundary portion between the conductive layer 30 and the semiconductor layer 41 is more preferably provided at the height of the conductive layer 31. Other structures of the semiconductor memory device 1 according to the fourth embodiment are the same as those of the third embodiment.

<4-2> Manufacturing Method

Figure 34:
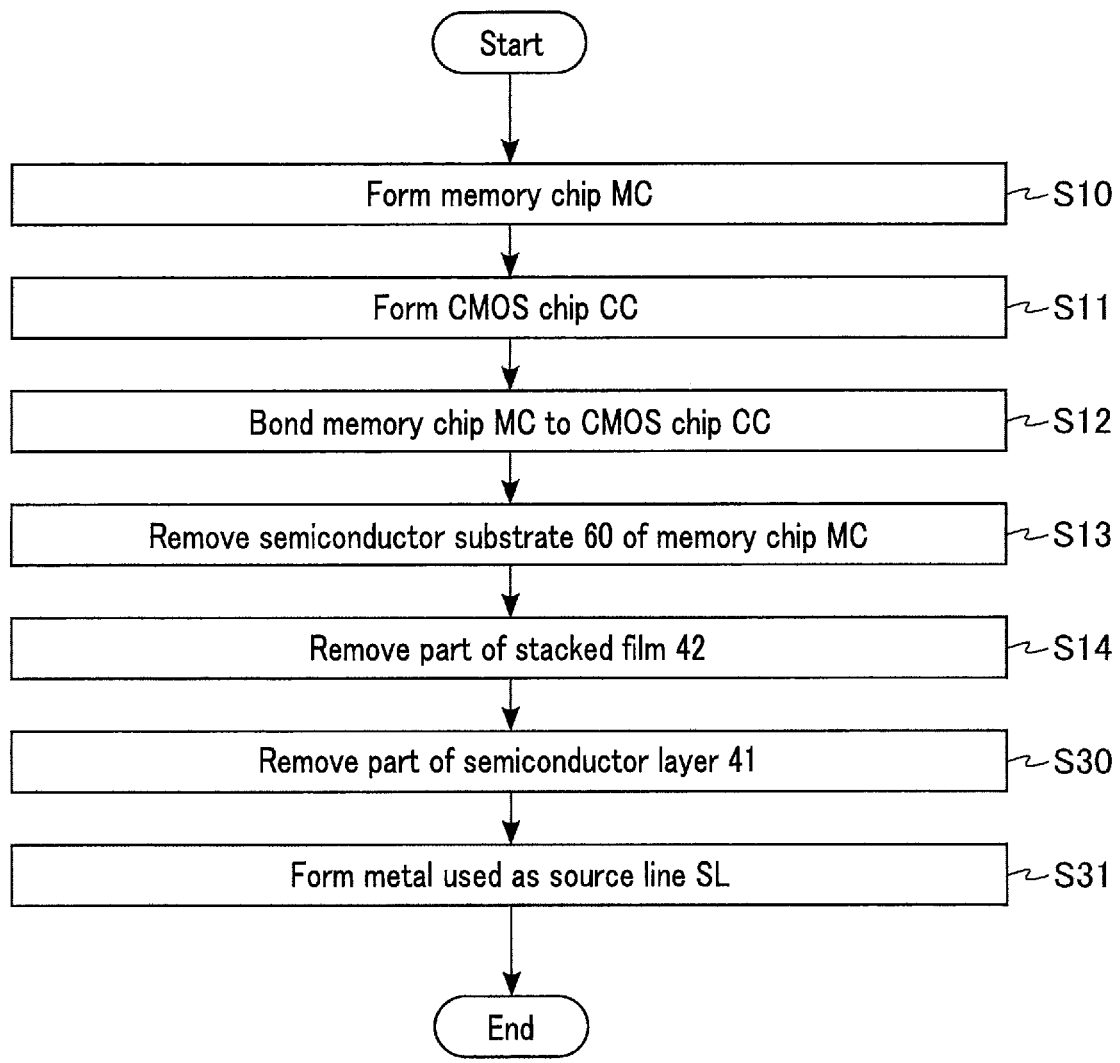
FIG. 34 is a flowchart showing an example of a method for manufacturing a semiconductor memory device according to the fourth embodiment.
Figure 35:
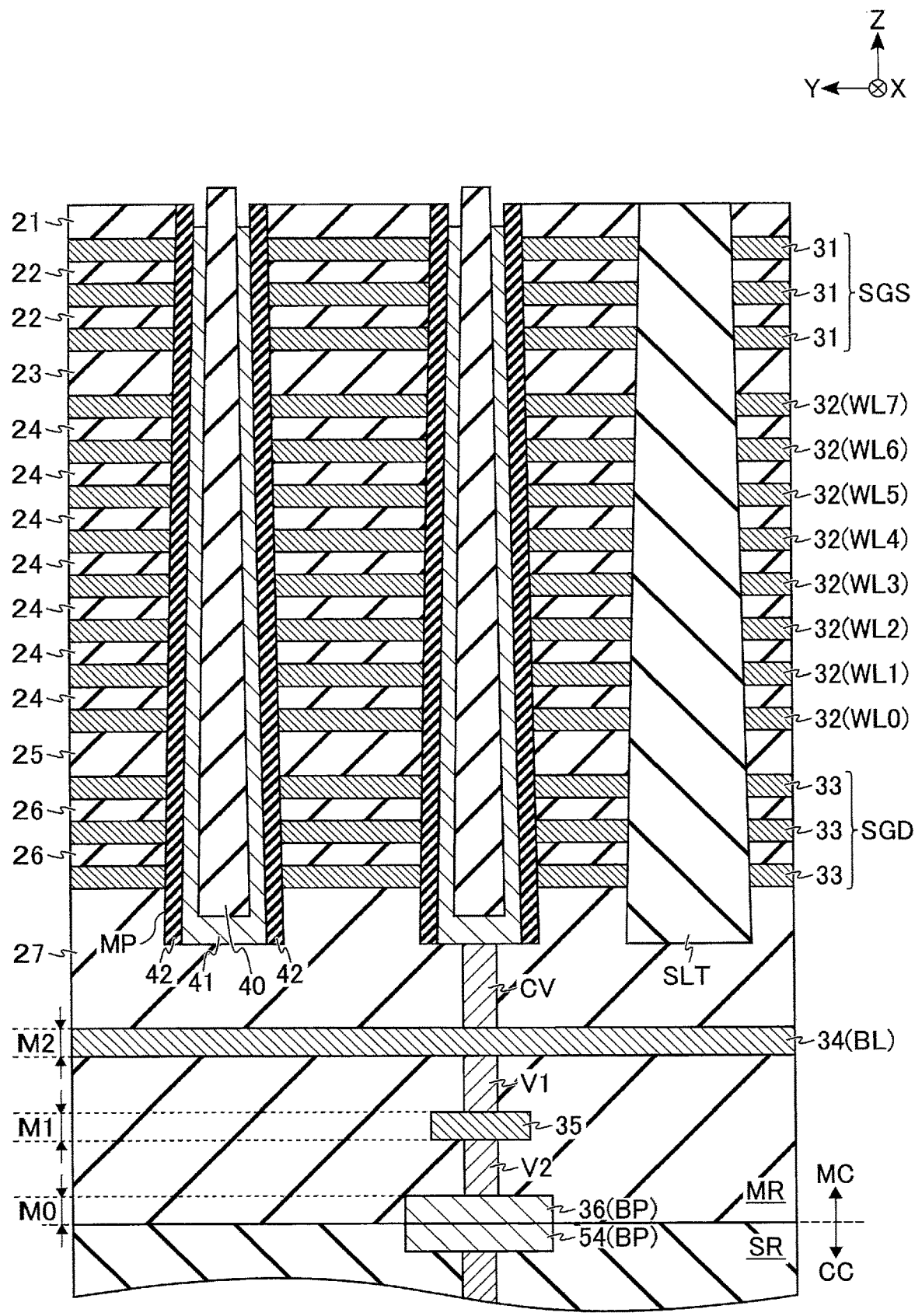
FIGS. 35 and 36 are cross-sectional views showing an example of a cross-sectional structure during manufacturing of the semiconductor memory device according to the fourth embodiment.
Figure 36:
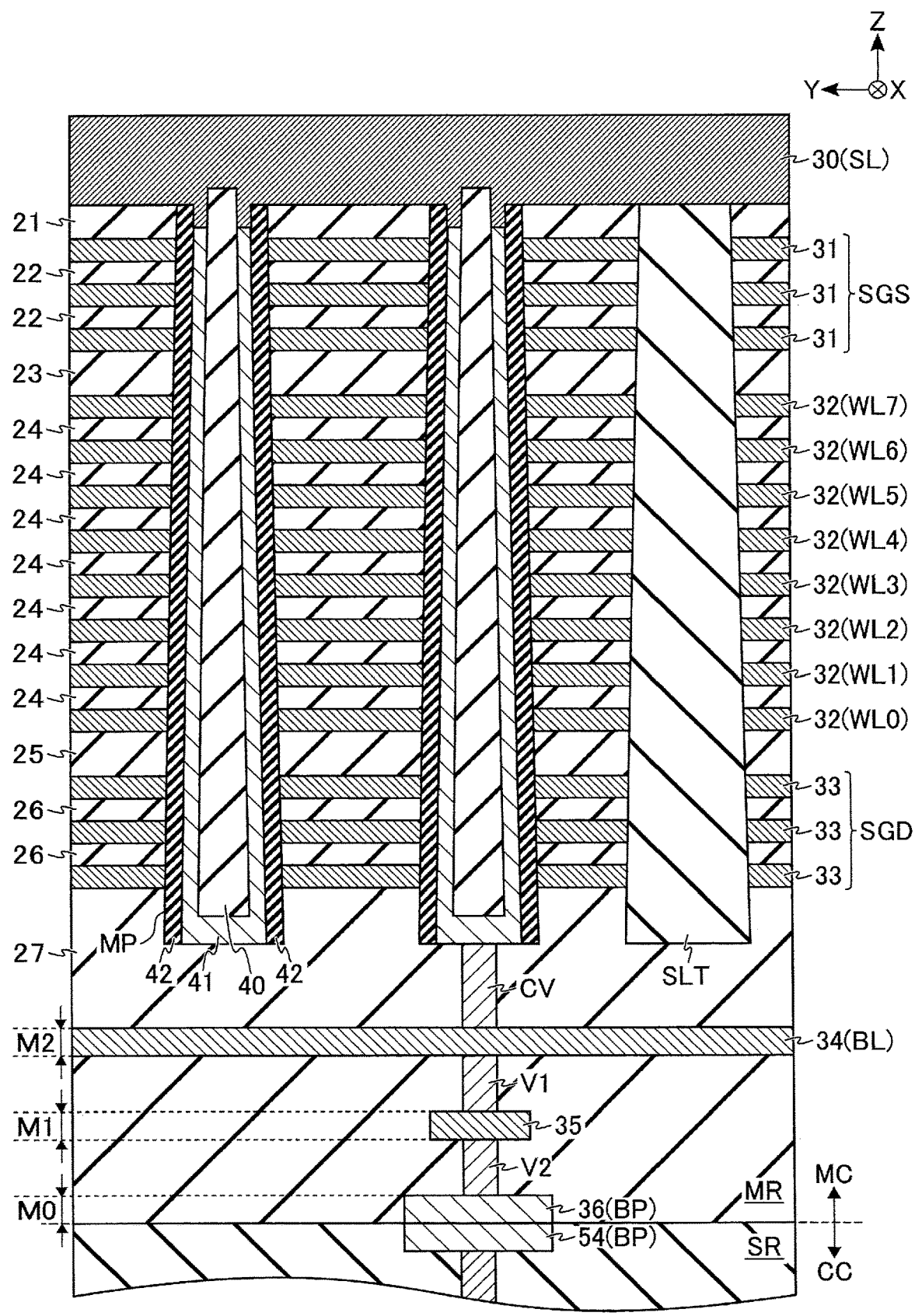

FIG. 34 is a flowchart showing an example of a manufacturing method of the semiconductor memory device 4 according to the first embodiment. FIGS. 35 and 36 are a cross-sectional view showing an example of a cross-sectional structure during manufacturing of the semiconductor memory device 1 according to the fourth embodiment. FIGS. 35 to 36 show the structure of a cross section that includes the region shown in FIG. 31. Hereinafter, a method of forming a source line SL in the semiconductor memory device 4 according to the first embodiment will be described with reference to FIG. 34 as appropriate.

First, as in the first embodiment, the memory chip MC is formed (step S10), and the CMOS chip CC is formed (step S11). Then, as in the first embodiment, the memory chip MC and the CMOS chip CC are bonded together (step S12). Next, as in the first embodiment, the semiconductor substrate 60 of the memory chip MC is removed (step S13), and a part of the stacked film 42 is removed (step S14).

Next, as shown in FIG. 35, a part of the semiconductor layer 41 is removed (step S30). In the present process, for example, wet etching using a condition that allows selective removal of the semiconductor layer 41 is performed. At this time, a structure in which the core member protrudes at the bottom of the memory pillar MP may be formed. The surface of the semiconductor layer 41 is provided within the range described with reference to FIGS. 31 to 33. In other words, the surface of the semiconductor layer 41 is provided at the height of the insulating layers 21 and 22 and the conductive layer 31.

Next, as shown in FIG. 36, a metal used as the source line SL is formed (step S31). In the present example, a single-phase conductive layer 30 is formed as the source line SL. The present embodiment is not limited to this, and a stacked structure consisting of titanium nitride and aluminum may be formed similarly to the first embodiment, or another metal interconnect may be formed. The conductive layer 30 is also embedded in the portion where the semiconductor layer 41 has been removed in the memory pillar MP. As a result, the semiconductor layer 41 and the conductive layer 30 are in contact with each other in the memory pillar MP.

As described above, a structure is formed in which the conductive layer 30 used as the source line SL enters the portion where the semiconductor layer 41 was previously formed in the memory pillar MP. Thereafter, the insulating layer 20 is formed on the conductive layer 62, and processes related to a formation of contacts coupled to the source line SL and a formation of a pad are performed as appropriate. The manufacturing steps described in the above are merely examples. Another step may be inserted between the manufacturing steps.

<4-3> Advantageous Effects of Fourth Embodiment

As described above, in the semiconductor memory device 1 according to the fourth embodiment, a part of the channel (the semiconductor layer 41) is removed, and the metal used as the source line SL enters the region where the semiconductor layer 41 was previously formed in the memory pillar MP. To be more specific, the boundary portion between the channel and the source line SL is arranged in the vicinity of the select gate line SGS, that is, in the vicinity of the select transistor ST2.

In such a case, similarly to the third embodiment, during a read operation, the fringe electric field generated between the select gate line SGS and the source line SL easily reaches the boundary portion in which a Schottky junction is formed. As a result, the semiconductor memory device 1 according to the fourth embodiment can reduce a contact resistance between the channel and the source line SL more than in the first embodiment. As a result, the semiconductor memory device 1 according to the fourth embodiment can improve the performance of a read operation while suppressing the manufacturing cost of the semiconductor memory device 1 as in the first embodiment.

The fourth embodiment may be combined with either the first embodiment or the second embodiment. That is, the semiconductor memory device 1 according to the fourth embodiment may perform a read operation of applying a reverse bias to a Schottky junction, which is described in the first embodiment, or may perform a read operation of applying a forward bias to a Schottky junction, which is described in the second embodiment. In any case, the semiconductor memory device 1 according to the fourth embodiment can improve the performance of a read operation more than in the embodiment combined with the fourth embodiment.

<5> Modifications, Etc

Figure 37:
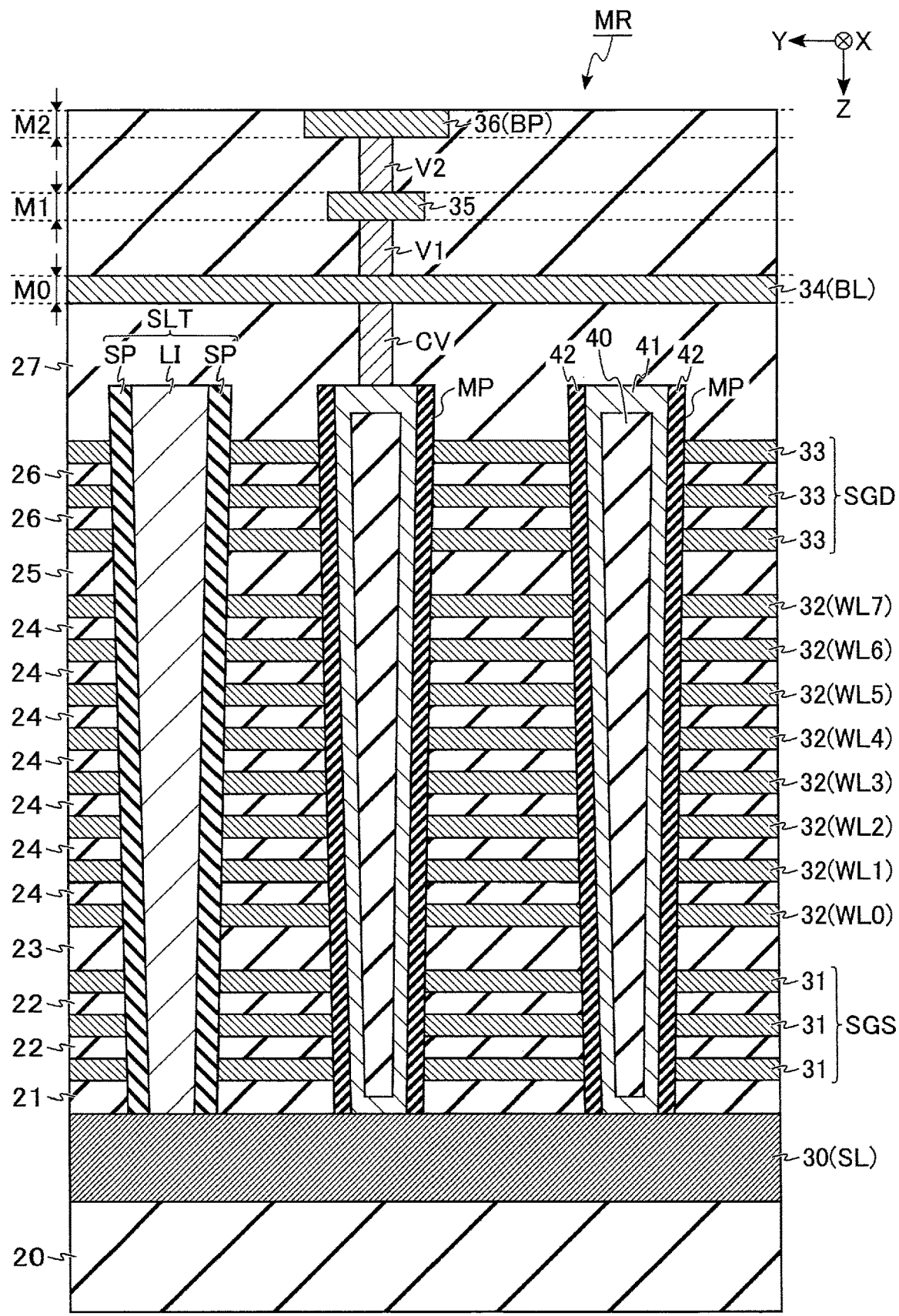
FIG. 37 is a cross-sectional view showing an example of a cross-sectional structure in a memory region of a semiconductor memory device according to a modification of the first embodiment.

In the above-described embodiment, a voltage may be applied to the source line SL via a contact provided in the slit SLT. FIG. 37 is a cross-sectional view showing an example of a cross-sectional structure in a memory region of a semiconductor memory device according to a modification of the first embodiment. As shown in FIG. 37, in the modification of the first embodiment, each slit SLT includes a contact LI and a spacer SP. The contact LI is a conductor including a portion that extends in the X direction. The spacer SP is an insulator provided on a side surface of the contact LI. The contact LI and a conductor adjacent to the contact LI in the Y direction are distanced and insulated by the spacer SP. The contact LI is thus used as a part of the source line SL. The structure having the contact LI may be applied to any of the second to fourth embodiments.

In the above embodiments, the memory pillar MP may be such a structure that two or more memory pillars MP are coupled together in the Z direction. Furthermore, the memory pillar MP may be such a structure that a pillar corresponding to the select gate line SGD and a pillar corresponding to the word line WL are coupled together. Each of the memory pillar MP and contacts CV, CS, C0 to C3, V1, and V2 may have either a tapered or reverse-tapered shape, or a shape that bulges at the middle (bowed shape). Similarly, the slit SLT may have either a tapered or reverse-tapered shape, or a shape that bulges at the middle (bowed shape). A cross-sectional structure of the memory pillar MP may be oval, or may be freely designed.

In the foregoing embodiments, the memory cell array may include one or more dummy word lines between the word line WL0 and the select gate line SGS and between the word line WL7 and the select gate line SGD. If dummy word lines are provided, dummy transistors provided in the number corresponding to the number of dummy word lines are provided between the memory cell transistor MT0 and the select transistor STS and between the memory cell transistor MT7 and the select transistor STD. Each of the dummy transistors has a configuration similar to that of the memory cell transistor MT, and is a memory cell transistor not used for storing data. If two or more memory pillars MP are coupled in the Z-direction, the memory cell transistor MT in the vicinity of the coupling portion of the pillars may be used as a dummy transistor.

The read operation and the erase operation described in the foregoing embodiments are merely shown as examples. If the semiconductor memory device 1 performs a read operation of the first embodiment, at least the voltage of the bit line BL may be set to be higher than the voltage of the source line SL. If the semiconductor memory device 1 performs a read operation of the second embodiment, on the other hand, at least the voltage of the source line SL may be set to be higher than the voltage of the bit line BL.

Herein, the term "couple" refers to electrical coupling, and does not exclude interposition of another component. The term "electrically coupled" may indicate coupling via an insulator as long as the same operation as that by electrical coupling is possible. The term "columnar" indicates being a structure which is provided in a hole formed in the manufacturing step of the semiconductor memory device 1. The term "plan view" corresponds to, for example, viewing an object in a direction perpendicular to the surface of the semiconductor substrate 50. The term "region" may be regarded as a structure included within the semiconductor substrate 50 of the CMOS chip CC. For example, when the semiconductor substrate 50 is defined as including a memory region MR, the memory region MR is associated with a region above the semiconductor substrate 50. The term "height" refers to a distance between the semiconductor substrate 50 and a target structure in the Z direction with reference to the semiconductor substrate 50. A height of a layer includes a portion between a surface of the layer close to the semiconductor substrate 50 and a surface thereof far from the semiconductor substrate 50. The term "on/off ratio of the transistor" indicates a ratio of a current when the memory cell transistor MT is turned on to a current when the memory cell transistor MT is turned off. In order to enable discrimination between on and off of the memory cell transistor MT, the on/off ratio needs to be increased to some extent.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A semiconductor storage device comprising:
   a substrate;
   a plurality of first conductive layers provided above the substrate, the plurality of first conductive layers being mutually separated in a first direction;
   a pillar penetrating the plurality of the first conductive layers, the pillar including a first semiconductor layer extending in the first direction, and parts of the pillar that intersect with the first conductive layers functioning as memory cells;
   a second conductive layer provided above the plurality of first conductive layers and being in contact with the first semiconductor layer, a portion of the second conductive layer that is in contact with the first semiconductor layer being made of a metal or a silicide; and
   a first insulating layer provided between the plurality of first conductive layers and the second conductive layer and being in contact with the second conductive layer,
   wherein:
   a concentration of impurity in the first semiconductor layer is $10^{19}$ (atoms/cm$^3$) or lower, and
   an interval in the first direction between the substrate and a boundary portion between the first semiconductor layer and the second conductive layer is shorter than an interval in the first direction between the first insulating layer and the substrate.

2. The semiconductor storage device of claim 1, further comprising:
   a first chip that includes the substrate and a first junction metal coupled to a circuit formed in the substrate; and
   a second chip that includes the plurality of first conductive layers, the second conductive layer, the pillar, and a second junction metal coupled to the pillar,
   wherein the first junction metal and the second junction metal are coupled to each other.

3. The semiconductor storage device of claim 1, further comprising:
   a third conductive layer provided between the plurality of first conductive layers and the first insulating layer and being penetrated by the pillar,
   wherein a location of the boundary portion is included at a height at which the third conductive layer is provided.

4. The semiconductor storage device of claim 1, further comprising:
   a third conductive layer provided between the plurality of first conductive layers and the second conductive layer and being penetrated by the pillar,
   wherein:
   no conductive layer is included between the third conductive layer and the second conductive layer, and
   an interval in the first direction between the third conductive layer and the second conductive layer is equal to or shorter than 50 nm.

5. The semiconductor storage device of claim 1, further comprising:
   a fourth conductive layer provided between the substrate and the plurality of first conductive layers and electrically coupled to the first semiconductor layer,
   wherein:
   the second conductive layer is used as a source line, and
   the fourth conductive layer is used as a bit line.

6. The semiconductor storage device of claim 5, further comprising:
   a control circuit configured to perform a read operation,
   wherein in a read operation the control circuit applies, when determining a threshold voltage of a memory cell, a first voltage to the source line and a second voltage higher than the first voltage to the bit line.

7. The semiconductor storage device of claim 5, further comprising:
   a control circuit configured to perform a read operation,
   wherein in a read operation the control circuit applies, when determining a threshold voltage of a memory cell, a third voltage to the source line and a fourth voltage lower than the third voltage to the bit line.

8. The semiconductor storage device of claim 1, wherein the second conductive layer includes any one selected from the group consisting of titanium, titanium silicide, titanium nitride, nickel silicide, and tungsten.

* * * * *